United States Patent
George et al.

(10) Patent No.: US 7,774,444 B1
(45) Date of Patent: Aug. 10, 2010

(54) SAN SIMULATOR

(75) Inventors: Kuriakose K. George, Pune (IN); Ajay S. Wani, Pune (IN); Smriti Yamini, Bangalore (IN)

(73) Assignee: Symantec Operating Corporation, Mountain View, CA (US)

( * ) Notice: Subject to any disclaimer, the term of this patent is extended or adjusted under 35 U.S.C. 154(b) by 2159 days.

(21) Appl. No.: 10/271,492

(22) Filed: Oct. 16, 2002

(51) Int. Cl.
*G06F 15/173* (2006.01)

(52) U.S. Cl. ............... 709/223; 709/217; 709/224; 711/170

(58) Field of Classification Search ........... 709/203, 709/217, 223–224; 711/170; 714/6; 707/2, 707/10, 102, 104.1
See application file for complete search history.

(56) References Cited

U.S. PATENT DOCUMENTS

| | | | |
|---|---|---|---|
| 6,421,723 B1 * | 7/2002 | Tawil | 709/224 |
| 6,697,924 B2 * | 2/2004 | Swank | 711/163 |
| 6,745,207 B2 * | 6/2004 | Reuter et al. | 1/1 |
| 6,816,917 B2 * | 11/2004 | Dicorpo et al. | 710/5 |
| 6,839,746 B1 * | 1/2005 | Muthiyan et al. | 709/220 |
| 6,854,035 B2 * | 2/2005 | Dunham et al. | 711/117 |
| 6,892,264 B2 * | 5/2005 | Lamb | 710/301 |
| 2003/0131182 A1 * | 7/2003 | Kumar et al. | 711/5 |

OTHER PUBLICATIONS

Molero et al., "Modeling and Simulation of Storage Area Networks," IEEE 2000, 0-7695-0728-X/00, 2000, (pp. 307-314).
The Architecture of VERITAS SANpoint Control™ 2.0, Veritas, 2001, (42 Pages).

* cited by examiner

*Primary Examiner*—Lashonda T Jacobs
(74) *Attorney, Agent, or Firm*—Robert C Kowert; Meyertons, Hood, Kivlin, Kowert & Goetzel, P.C.

(57) ABSTRACT

Embodiments of a SAN simulator that may be used with SAN management systems to create a virtual SAN with a configurable number of various types of virtual SAN objects. The virtual SAN may be accessed in performing various SAN management tasks in a virtual environment. In one embodiment, the virtual SAN objects may be generated in accordance with SAN simulator configuration information describing the types and numbers of virtual SAN objects to be generated. In one embodiment, to enter a virtual SAN object in the virtual SAN data representation, each virtual SAN object's object type and attributes may be checked in an object schema table to verify that the specified type of virtual SAN object is supported by the SAN simulator. One embodiment may include a SAN simulator explorer that serves as an interface between a SAN management server and the virtual SAN when performing SAN management tasks.

30 Claims, 17 Drawing Sheets

SAN SIMULATOR

BACKGROUND OF THE INVENTION

1. Field of the Invention

This invention is related to the field of storage management and, more particularly, to software used in simulation of storage area networks.

2. Description of the Related Art

In the past, large organizations relied heavily on parallel SCSI (Small Computer System Interface) technology to provide the performance required for their enterprise data storage needs. More recently, organizations are recognizing that the restrictions imposed by SCSI architecture are too costly for SCSI to continue as a viable solution. Such restrictions include the following:

- SCSI disk arrays must be located no more than 25 meters from the host server;
- The parallel SCSI bus is susceptible to data errors resulting from slight timing discrepancies or improper port termination; and
- SCSI array servicing frequently requires downtime for every disk in the array.

The storage area network (SAN) model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices.

The versatility of the SAN model enables organizations to perform tasks that were previously difficult to implement, such as LAN-free and server-free tape backup, storage leasing, and full-motion video services. SAN deployment promises numerous advantages, including cost management through storage consolidation, higher availability of data, better performance and seamless management of online and offline data. In addition, the LAN is relieved of the overhead of disk access and tape backup, data availability becomes less server-dependent, and downtime incurred by service and maintenance tasks affects more granular portions of the available storage system.

Many SAN management offerings in today's marketplace offer the ability to understand the physical connectivity of the SAN through the discovery of device interconnects. By providing a one-sided view of the SAN, these offerings display only a switch's perspective of physical connections.

SAN has many advantages and improves the functionality of accessing stored data in computer networks compared to other enterprise data storage solutions. However, SAN hardware may be expensive, and thus cost considerations come into the picture when enterprises are considering adopting a SAN as a solution to their data storage needs. Thus, a mechanism that allows enterprises to configure and test various SAN configurations to determine a solution that meets the enterprise's data storage requirements in a cost-effective way without purchasing at least some of the SAN hardware required to test the various SAN configurations is desirable. Further, developers of SAN software such as SAN management systems may need to test their software in a variety of SAN environments, from simple SANs with a few SAN devices to complex SANs with multiple fabrics and numerous SAN devices of various, heterogeneous types. Thus, it is desirable that the mechanism also be usable by SAN developers when performing tests of SAN software in a variety of SAN environments, from simple to complex, thus avoiding the need to purchase and install the SAN hardware required to test in various SAN environments, and the need to reconfigure the physical SAN between tests.

SUMMARY OF THE INVENTION

Embodiments of a SAN simulator that may be used with SAN management systems to create a virtual SAN with a configurable number of various types of SAN objects are described. The virtual SAN may be used in performing various SAN management tasks in a virtual environment rather than in a "real," physical SAN environment. For example, the SAN simulator may be used in generating virtual SANs for use by SAN software developers in testing SAN software, as well as by end users to test various virtual SAN configurations to determine a desired SAN configuration for an enterprise before investing in the SAN hardware needed to implement the desired SAN configuration.

In one embodiment, a plurality of virtual SAN objects may be generated. In one embodiment, the virtual SAN objects may be generated in accordance with information describing the types and numbers of virtual SAN objects to be generated accessed from one or more SAN simulator configuration information files. In one embodiment, the generation of the virtual SAN objects may be performed in response to a SAN simulator "enable" flag that may be read from a configuration file at startup of a SAN management system. A virtual SAN including the generated virtual SAN objects may be generated. In one embodiment, the virtual SAN is a data representation (e.g. database) including the virtual SAN objects and other information describing the SAN (e.g. relationship information among the virtual SAN objects).

In one embodiment, types of virtual SAN objects supported by the SAN simulator may be defined in one or more object schema tables. In one embodiment, the schema table(s) may include one or more attributes that virtual SAN objects of each type may have. In one embodiment, to enter a virtual SAN object in the virtual SAN data representation, each virtual SAN object's object type and attributes may be checked in the object schema table(s) to verify that the specified type of virtual SAN object is supported by the SAN simulator. One or more of the supported type of virtual SAN objects may then be added to the virtual SAN data representation.

The virtual SAN may be accessed to perform SAN management tasks. In one embodiment, the virtual SAN may be accessed by a SAN management server. In one embodiment, SAN management tasks may include one or more of, but are not limited to, testing SAN software, testing SAN configurations to determine a configuration for end-user application, zone management tasks, LUN management tasks, and adding/deleting/modifying virtual SAN objects, among others. In one embodiment, a SAN management task may be initiated through user interaction with a user interface. In one embodiment, results of a SAN management task may be displayed on the user interface.

One embodiment may include a SAN simulator explorer that serves as an interface between a SAN management server and the virtual SAN when performing SAN management tasks. In one embodiment, the SAN simulator explorer (e.g. a thread) may be started in response to a flag set to enable the SAN simulator in a SAN management system configuration file that may be read at startup of the SAN management system.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a SAN simulator that may be used with SAN management systems to create a virtual SAN with a configurable number of various types of SAN objects are described. The virtual SAN may be used in performing various SAN management tasks in a virtual environment rather than in a "real," physical SAN environment. For example, the SAN simulator may be used in generating virtual SANs for use by SAN software developers in testing SAN software, as well as by end users to test various virtual SAN configurations to determine a desired SAN configuration for an enterprise before investing in the SAN hardware needed to implement the desired SAN configuration.

Figure 1:
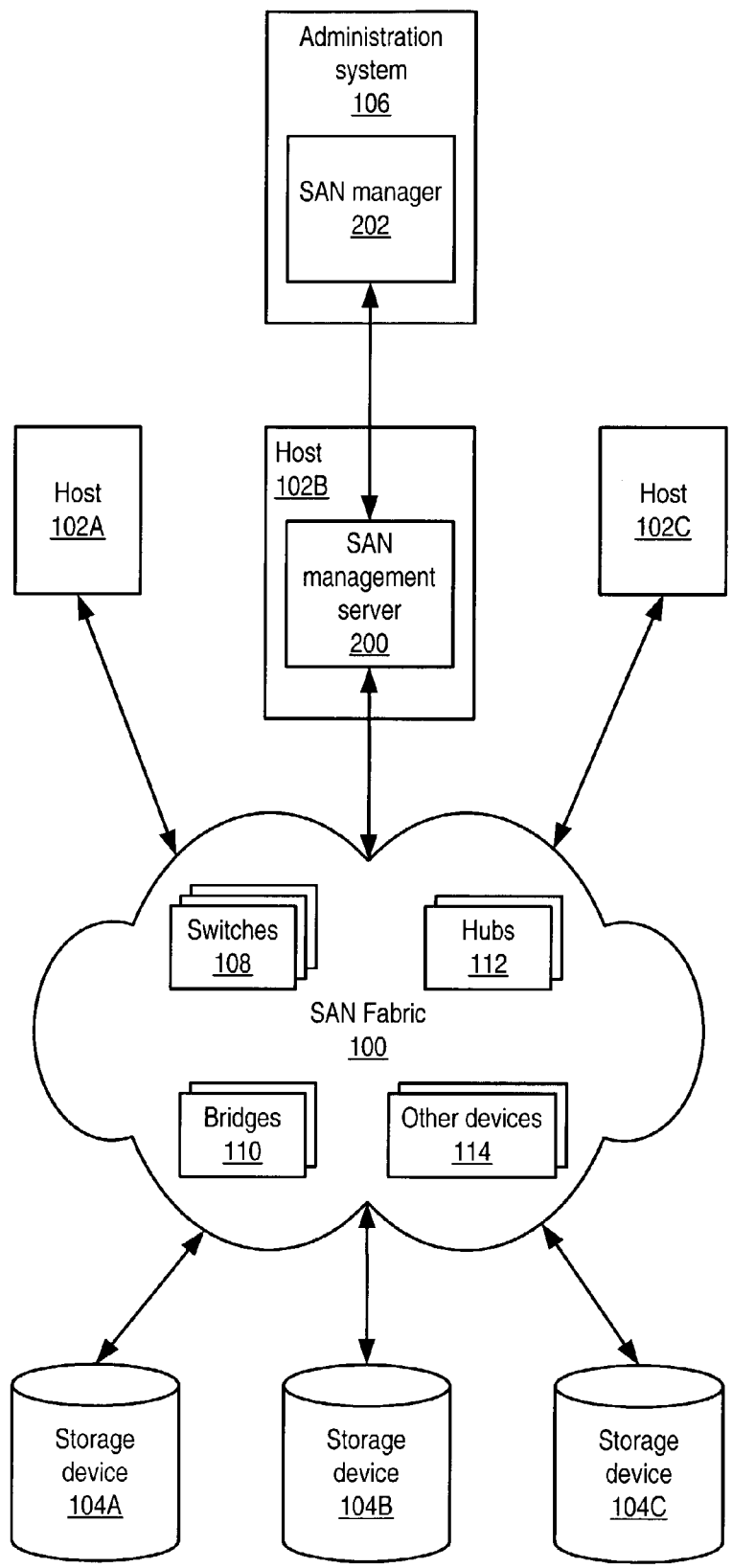
FIG. 1 shows an exemplary SAN implementing an embodiment of a SAN management system.

FIG. 1 shows an exemplary SAN implementing an embodiment of an exemplary SAN management system as described below. For one embodiment, a SAN may be described as a high-speed, special-purpose network that interconnects storage devices 104 (e.g. storage devices 104A, 104B, and 104C) with associated data servers (e.g. hosts 102A, 102B, and 102C) on behalf of a larger network of users. This dedicated network may employ Fibre Channel technology.

A SAN may be part of the overall network of computing resources for an enterprise or other entity. A SAN may include one or more hosts 102 (e.g. hosts 102A, 102B, and 102C), one or more storage devices 104 (e.g. hosts 102A, 102B, and 102C), and one or more SAN fabrics 100. A SAN may also include one or more administration systems 106. One or more end-user platforms (not shown) may access the SAN, for example via a LAN or WAN connection to one or more of the hosts 102.

Storage devices may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. Hosts 102 may run any of a variety of operating systems, including, but not limited to, Solaris 2.6, 7 and 8, Microsoft Windows NT 4.0 (Server and Enterprise Server), and Microsoft Windows 2000 (Server, Advanced Server and Datacenter Editions). Each host 102 may be connected to the fabric 100 via one or more Host Bus Adapters (HBAs).

The hardware that connects hosts 102 (and other devices such as workstations) to storage devices 104 in a SAN may be referred to as a fabric 100. The SAN fabric 100 enables server-to-storage device connectivity through Fibre Channel switching technology. The SAN fabric 100 hardware may include one or more of switches 108 (also referred to as fabric switches), bridges 110, hubs 112, or other devices 114 such as routers, as well as the interconnecting cables (for Fibre Channel SANs, fibre optic cables).

Figure 2:
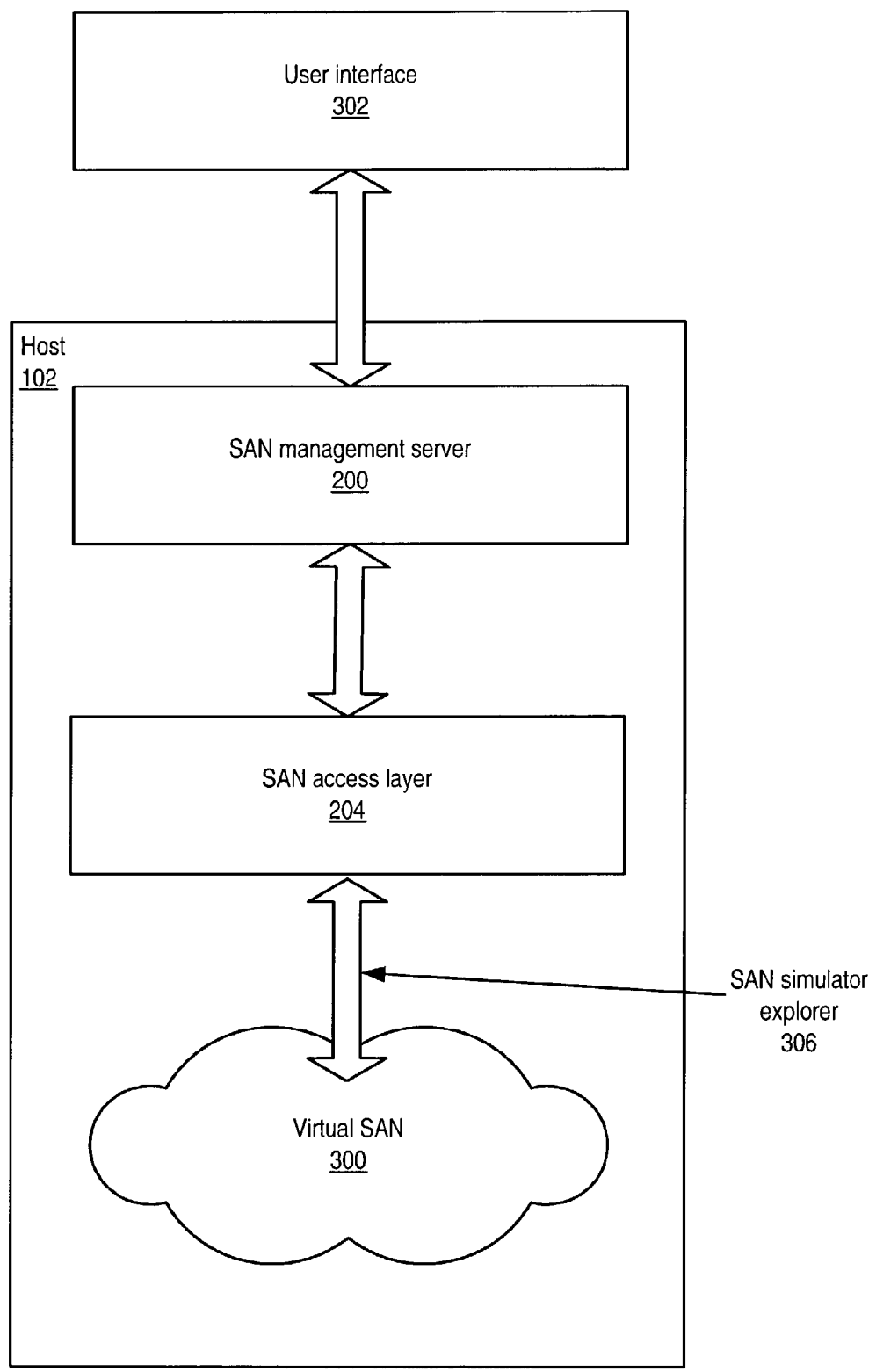
FIG. 2 illustrates a SAN management system interacting with a virtual SAN according to one embodiment.

SAN management systems may include an interface between the SAN hardware and the SAN management system's other components. For example, embodiments of the exemplary SAN management system described below may include a SAN access layer that serves as an interface between the SAN hardware and the SAN management system's other components, such as a SAN management server and a SAN manager. As illustrated in FIG. 2, the SAN access layer 204 may interact with a virtual SAN 300 generated by the SAN simulator, and the other components of the SAN management system may interact with the SAN access layer 204. The SAN access layer 204 provides SAN information, whether gathered from a physical SAN or a virtual SAN 300 generated by the SAN simulator, to the other components of the SAN management system such as SAN management server 200 and a user interface 302 (e.g. a SAN manager as described below). The SAN components that interact with the SAN access layer 204 are not necessarily aware of the source of the SAN information. In some embodiments, some operations on the virtual SAN 300 may be limited; for example, actual allocation of memory space in the virtual SAN 300 may not be performed in one embodiment.

In one embodiment of the exemplary SAN management system as described herein, explorers may be used by the SAN access layer 204 to discover SAN objects in the SAN, register the discovered SAN objects in a database, and gather information from the SAN objects. In one embodiment, the SAN simulator may include a SAN simulator explorer 306 that may be enabled when the SAN simulator is in use to serve as an interface between the virtual SAN 300 and the SAN access layer 204 to discover and gather information from virtual SAN objects in the virtual SAN 300.

Embodiments of the SAN simulator may be used to create a virtual SAN with a configurable number and type of virtual SAN objects. Embodiments of the SAN simulator do not "discover" SAN objects; instead, the SAN simulator may be used to generate virtual SAN objects and add the generated virtual SAN objects to a data representation of a virtual SAN (e.g. a database). The virtual SAN objects may then be accessed from the data representation and used, for example, in SAN management tasks including, but not limited to, SAN software testing and SAN configuration planning tasks. These virtual SAN objects may appear to the client as if they were physical SAN objects. Thus, using a virtual SAN 300 generated by the SAN simulator, a SAN need not be connected to a physical SAN; instead, the host 102 may run on an independent machine, accessing the virtual SAN 300, for example, to test SAN software in development environments and/or to test various SAN configurations generated by the SAN simulator to plan end-user SAN environments. Thus, using embodiments of the SAN simulator, physical SAN objects may not be required for at least some SAN management tasks.

In one embodiment, a SAN management system may include one or more configuration files which may be read at startup to configure the SAN management system. In one embodiment, one of the configuration files may include a flag to enable or disable the SAN simulator. If the flag is set to enable the SAN simulator, SAN simulator configuration information may be accessed to generate the virtual SAN objects and enter the virtual SAN objects into a data representation of the virtual SAN 300. The SAN simulator explorer 306 may be started. The SAN management server 200 may then access the SAN access layer 204 in performing SAN management tasks. The SAN access layer 204 may then access the data representation of the virtual SAN 300 through the SAN simulator explorer 306. In one embodiment, a SAN management task may be initiated through user interaction with the user interface 302. Results of the SAN management task may be returned by the SAN simulator explorer 306. In one embodiment, results of a SAN management task may be displayed on the user interface 302.

In one embodiment, if the flag is set to disable the SAN simulator, the SAN management system may start up in "normal" (i.e. not simulation) mode, the SAN access layer 204 may discover physical SAN objects on the SAN, and SAN management may be performed as described below for the exemplary SAN management system.

Figure 3A:
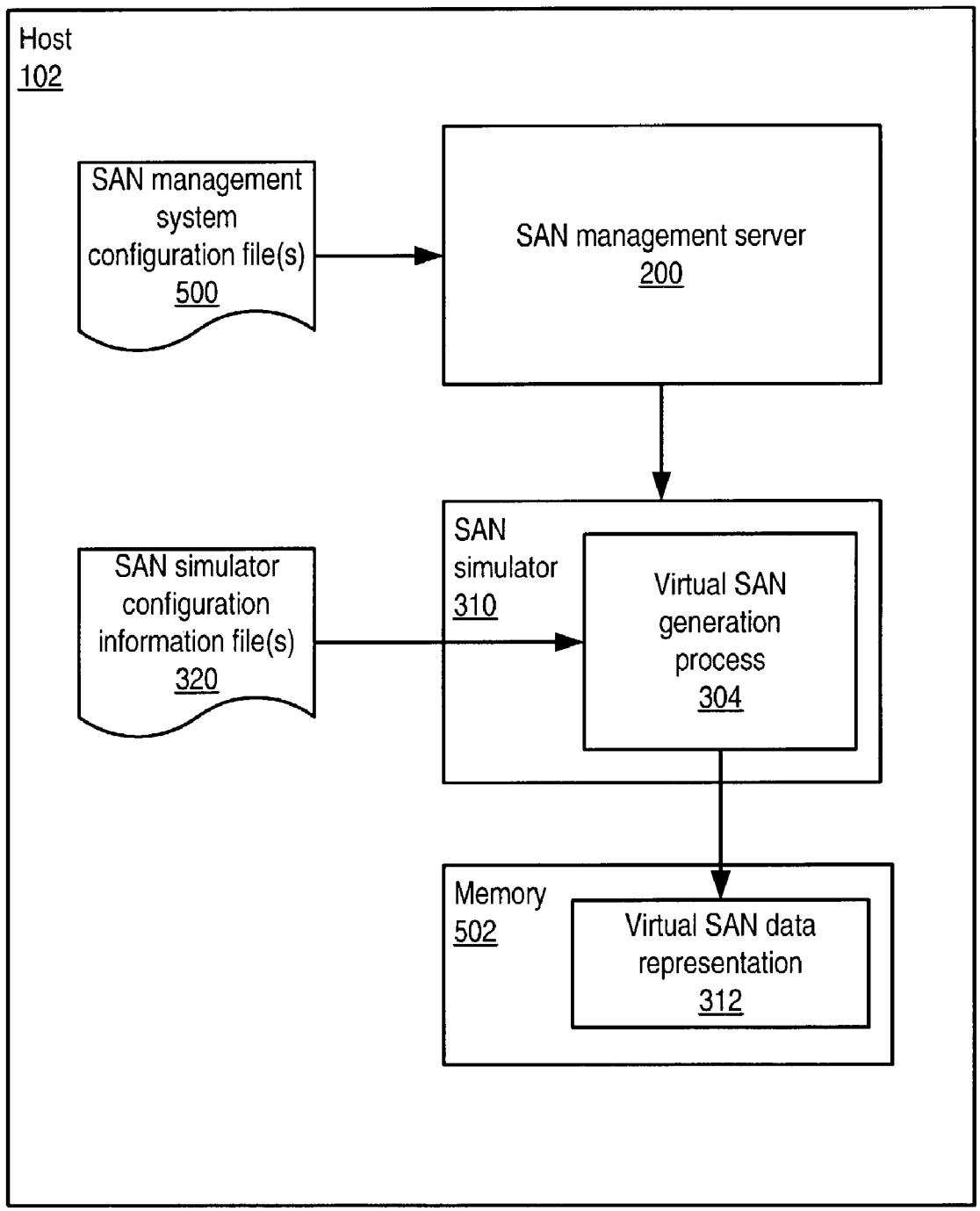
FIGS. 3A and 3B illustrate a SAN simulator during startup and runtime of a SAN management system according to one embodiment.
Figure 3B:
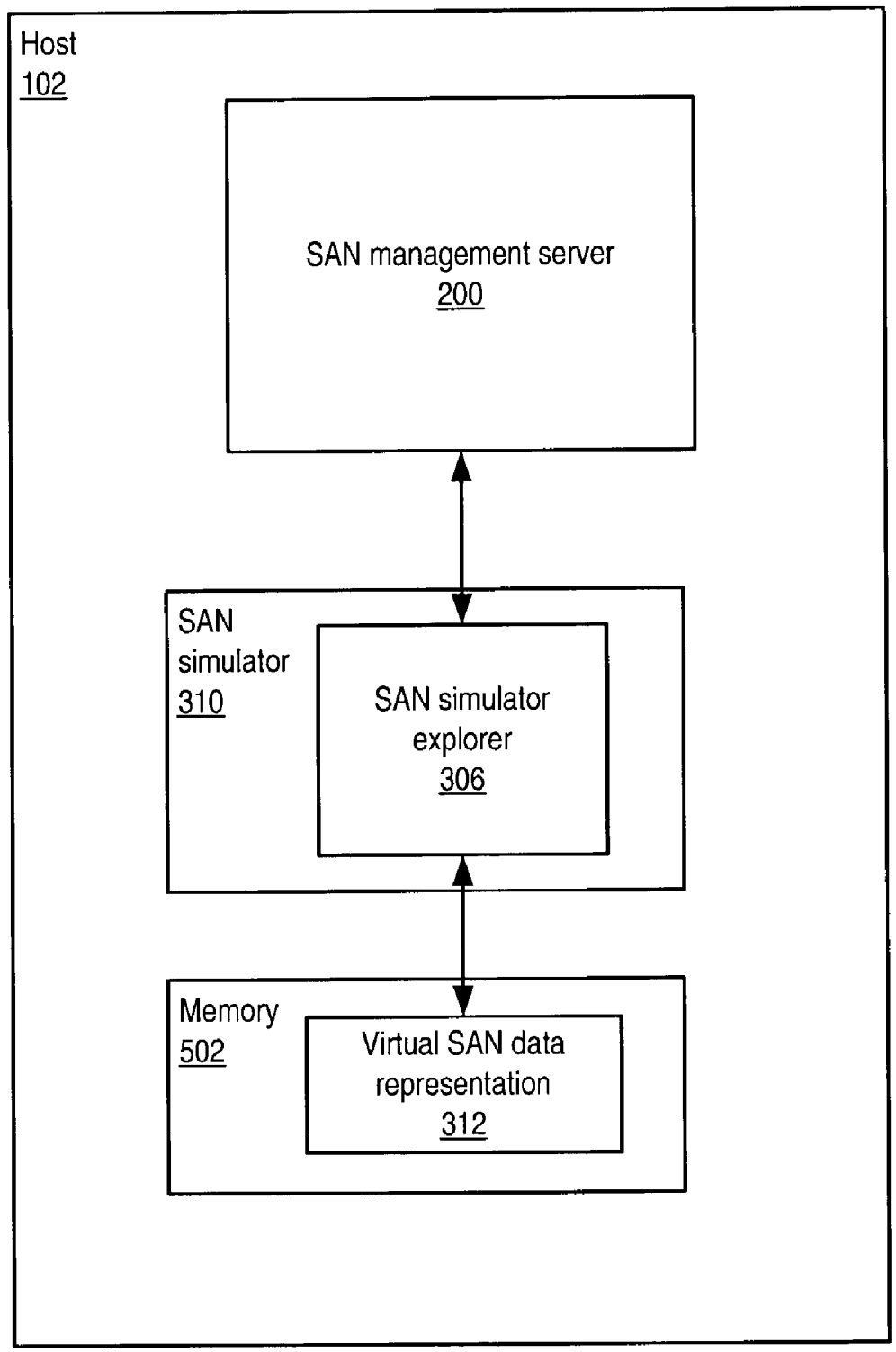

FIGS. 3A and 3B illustrate the SAN simulator during startup and runtime of a SAN management system according to one embodiment. FIG. 3A illustrates generation of a virtual SAN during startup of the SAN management system. In one embodiment, as mentioned above, a SAN management system may include one or more configuration files 500 which may be read by SAN management server 200 at startup to configure the SAN management system. In one embodiment, one of the configuration files 500 may include a flag to enable or disable the SAN simulator 310. If the flag is set to enable the SAN simulator 310, the SAN simulator 310 may read SAN simulator configuration information 320 to generate the virtual SAN objects and enter the virtual SAN objects into virtual SAN data representation 312 in memory 502. In one embodiment, memory 502 may be volatile storage such as system memory (e.g. random access (RAM) memory). In another embodiment, memory 502 may be non-volatile storage such as a hard disk. One or more other SAN simulator 310 processes may be started; for example a SAN simulation explorer, a zone management API, and/or a LUN management API may be started in response to the flag being set to enable the SAN simulator 310.

FIG. 3B illustrates using the SAN simulator during runtime to perform simulated SAN management tasks. The SAN management server 200 may access the virtual SAN data representation 312 in memory 502 through the SAN simulator 310. In one embodiment, a SAN simulator explorer 306 (e.g. a thread) may serve as an interface between the SAN management server 200 and the virtual SAN data representation 312 in memory 502. The SAN management server 200 may access the virtual SAN data representation 312 in memory 502 through the SAN simulator 310 to perform simulated SAN management tasks. In one embodiment as illustrated in FIG. 2, a SAN access layer (not shown) may access the virtual SAN data representation 312 in memory 502 through the SAN simulator explorer 306 on behalf of the SAN management server 200.

Note that, in one embodiment, the SAN simulator 310 may be enabled after startup (during runtime) of the SAN management system. For example, a user may initiate the SAN simulator 310 from a user interface of the SAN management system. The SAN simulator 310 may then generate the virtual SAN data representation 312, and the SAN management server 200 may access the virtual SAN data representation 312 in memory 502 through the SAN simulator 310 to perform simulated SAN management tasks.

Also note that other SAN software than a SAN management system may also use embodiments of the SAN simulator 310 to generate and access virtual SAN data representations 312 to perform various tasks of the software in simulated SAN environments.

Figure 4:
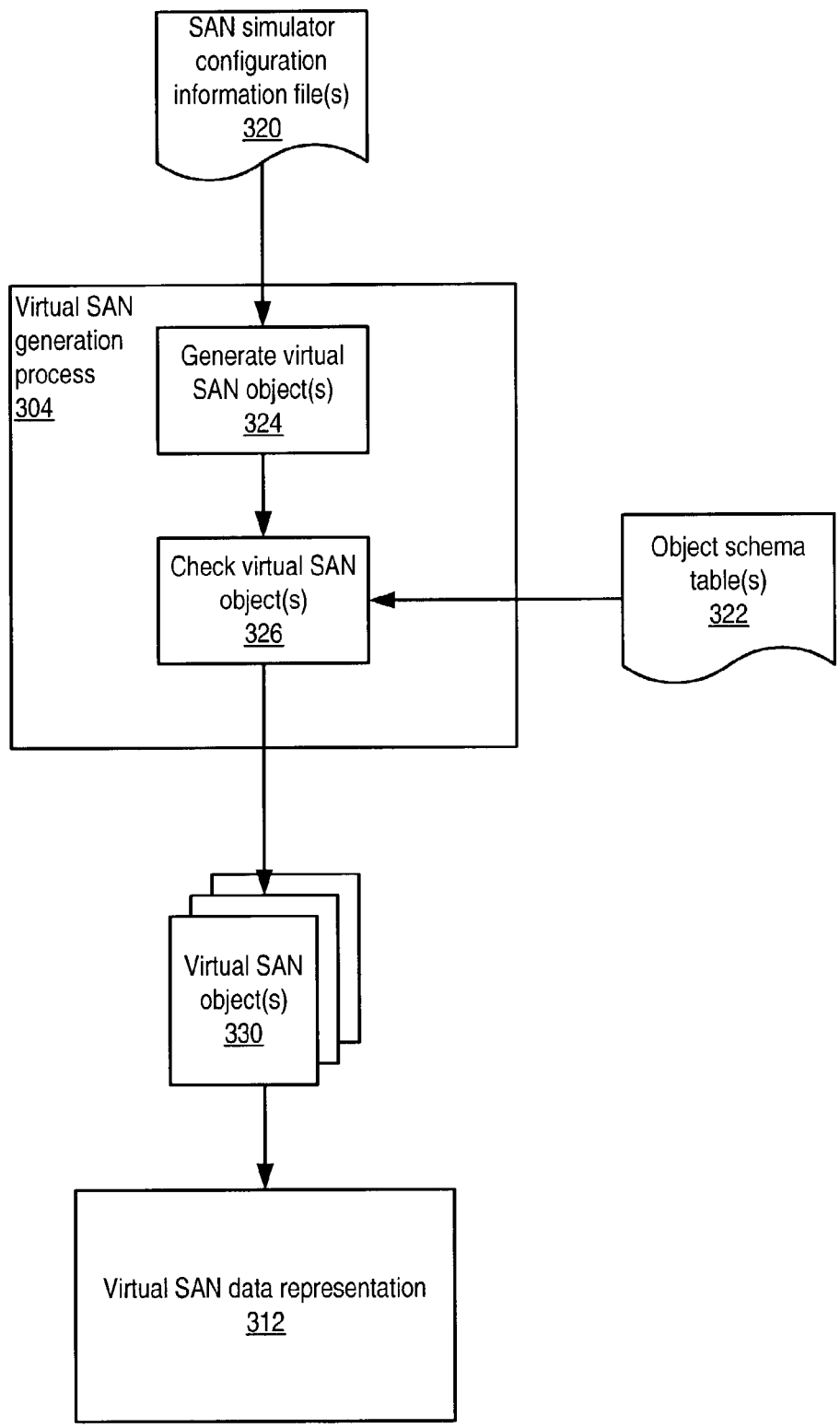
FIG. 4 illustrates a mechanism for generating a data representation of a virtual SAN including virtual SAN objects according to one embodiment.

FIG. 4 illustrates a mechanism for generating a data representation of a virtual SAN including virtual SAN objects according to one embodiment. One embodiment may include one or more SAN simulator configuration information files 320 that include information describing the virtual SAN objects to be generated and relationships among the virtual SAN objects. In one embodiment, the SAN simulator configuration information may be included in one or more configuration files of a SAN management system such as the exemplary SAN management system described herein. The SAN simulator configuration information files 320 may be read by a virtual SAN generation process 304 to generate the one or more virtual SAN objects 330 as indicated at 324. In one embodiment, types of objects supported by the SAN simulator may be defined in one or more object schema tables 322. In one embodiment, the schema table(s) may include one or more attributes that objects of each type may have. In one embodiment, as indicated at 326, to enter virtual SAN objects 330 in the virtual SAN data representation 312, each virtual SAN object's object type and attributes may be checked in the object schema table(s) 322 to verify that the virtual SAN object 330 as specified is supported by the SAN simulator.

Virtual SAN objects 330 that are supported may then be added to the virtual SAN data representation 312.

In one embodiment, the SAN simulator may generate virtual SAN objects to represent physical (or logical) SAN objects including one or more of, but not limited to, fabrics, switches, ports, enclosures, devices, nodes, hosts, host bus adapters (HBAs), storage adapters, array port binding, addressable units (AUs), zone configuration, and zones. In one embodiment, other virtual SAN objects, such as virtual hubs and/or routers, may be generated and included in the virtual SAN.

Each virtual SAN object may have one or more attributes. In one embodiment, each virtual SAN object may have an object type and an object key attribute. In one embodiment, object type may be defined as a macro. An object key may uniquely identify a virtual SAN object. In one embodiment, data corresponding to a virtual SAN object may be retrieved from a data representation of a virtual SAN including virtual SAN objects using the object key. In one embodiment, object keys may be represented as strings in a markup language such as XML.

In one embodiment of the exemplary SAN management system as described herein, explorers may be used to discover SAN objects and register the discovered SAN objects in a database. In one embodiment, the SAN simulator may include a SAN simulator explorer that may be enabled when the SAN simulator is in use to serve as an interface between the virtual SAN 300 and the SAN access layer 204.

One embodiment may include one or more SAN simulator configuration files that may include user-editable SAN simulator configuration information such as settings to enable or disable the SAN simulator, information describing the configuration of the virtual SAN 300 such as the number of HBAs, HBA ports, switches, switch ports, enclosures, storage adapters, array ports, address units, and other virtual SAN objects. In one embodiment, the SAN configuration information may be included as one or more sections in one or more configuration files of the SAN management system. In one embodiment, the SAN simulator explorer may run as a thread. In one embodiment, the SAN simulator explorer may be enabled or disabled by editing one or more SAN simulator configuration file(s) to modify an enable/disable setting for the SAN simulator. One embodiment may include one or more functions to read portions of the SAN simulator configuration file(s).

In one embodiment, the SAN simulator configuration information may include debug information for configuring the status and error messages in debug mode. In one embodiment, the SAN simulator configuration information may include information for configuring virtual host(s) and the number of HBAs and/or HBA ports each virtual host is to include.

In one embodiment, the SAN simulator configuration information may include information for configuring virtual switches and the number of switch ports per virtual switch. In one embodiment, the virtual switch configuration information may include one or more labels for defining switches. The following is an exemplary format for these labels and is not intended to be limiting:

sw_vendorname_modelname=<number of switches> where vendorname is the name of the vendor of the switch, modelname is the name of the model of the switch, and <number of switches> indicates the number of virtual switches of this type to be generated. As an example, to generate four virtual Compaq switches of the model Silkworm 2800, the SAN simulator configuration information may include the following:

sw_compaq_silkworm2800=4

In one embodiment, the SAN simulator configuration information may include information for configuring enclosures. In one embodiment, the virtual enclosure configuration information may include one or more labels for defining enclosures. The following is an exemplary format for these labels and is not intended to be limiting:

enc_vendorname_modelname=number of enclosures where vendorname and modelname give the name of the vendor and model of the enclosure, and number of enclosures indicates the number of virtual enclosures of this type to be generated. As an example, to generate one virtual EMC disk array of the model CLARiiON, the SAN simulator configuration information may include the following:

enc_emc_clarion=1

In one embodiment, the SAN simulator configuration information may include information for configuring storage adapters. One embodiment may include a "default" label that may be used to provide a default value for the number of storage adapters for a type of enclosure. Different kinds of enclosures that may be created are specified in the virtual enclosure configuration information as illustrated above. In one embodiment, the number of storage adapters for a type of enclosure may be specified. If the number of storage adapters for a particular type of enclosure is not specified, the default value may be used. In one embodiment, the virtual enclosure configuration information may include one or more labels for defining the number of storage adapters for enclosures if the default value is not used. The following is an exemplary format for these labels and is not intended to be limiting:

sa_vendorname_modelname=number of adapters where vendorname and modelname give the name of the vendor and model of the enclosure, and number of adapters indicates the number of storage adapters for this enclosure type. For example, to specify six virtual storage adapters for the virtual disk array CLARiiON by EMC, the SAN simulator configuration information may include the following:

sa_emc_clariion=6

In one embodiment, the SAN simulator configuration information may include information for configuring array ports. One embodiment may include a "default" label that may be used to provide a default value for the number of array ports for a type of enclosure. In one embodiment, the number of array ports for a type of enclosure may be specified. If the number of array ports for a particular type of enclosure is not specified, the default value may be used. In one embodiment, the virtual enclosure configuration information may include one or more labels for defining the number of array ports for enclosures if the default value is not used. The following is an exemplary format for these labels and is not intended to be limiting:

ap_vendorname_modelname=number of array ports where vendorname and modelname give the name of the vendor and model of the enclosure, and number of array ports indicates the number of array ports for this enclosure type. As an example, to create four array ports for each virtual Hitachi disk array with the model number 7700E, the SAN simulator configuration information may include the following:

ap_hitachi_7700E=4

In one embodiment, the SAN simulator configuration information may include information for configuring addressable units (AUs). One embodiment may include a "default"

label that may be used to provide a default value for the number of AUs for a type of enclosure. In one embodiment, the number of AUs for a type of enclosure may be specified. If the number of AUs for a particular type of enclosure is not specified, the default value may be used. In one embodiment, the virtual enclosure configuration information may include one or more labels for defining the number of AUs for enclosures if the default value is not used. The following is an exemplary format for these labels and is not intended to be limiting:

au_vendorname_modelname=number of AUs where vendorname and modelname indicate the vendor and model of the enclosure, and number of AUs indicates the number of AUs for this enclosure type. As an example, if each virtual Hitachi disk array with model number 7700E is to have 10 address units, the SAN simulator configuration information may include the following:

au_hitachi_7700E=10

In one embodiment, to configure a new switch, enclosure or other virtual device type, one or more entries may be made to the SAN simulator configuration information. In one embodiment, no changes to code are required.

The following describes one embodiment of using the SAN simulator. The "enable" indicator for the SAN simulator explorer is read from the SAN simulator configuration information. If the SAN simulator explorer is enabled, then the rest of the SAN simulator configuration information may be read from the file(s) to configure the virtual SAN. In one embodiment, Application Programmer Interfaces (APIs) for zone management and LUN management (e.g. LUN masking) may be registered so that when a zone management or LUN management operation is invoked (e.g. by a user through a user interface such as a SAN manager as described below), a corresponding SAN simulator function is called.

Figure 5:
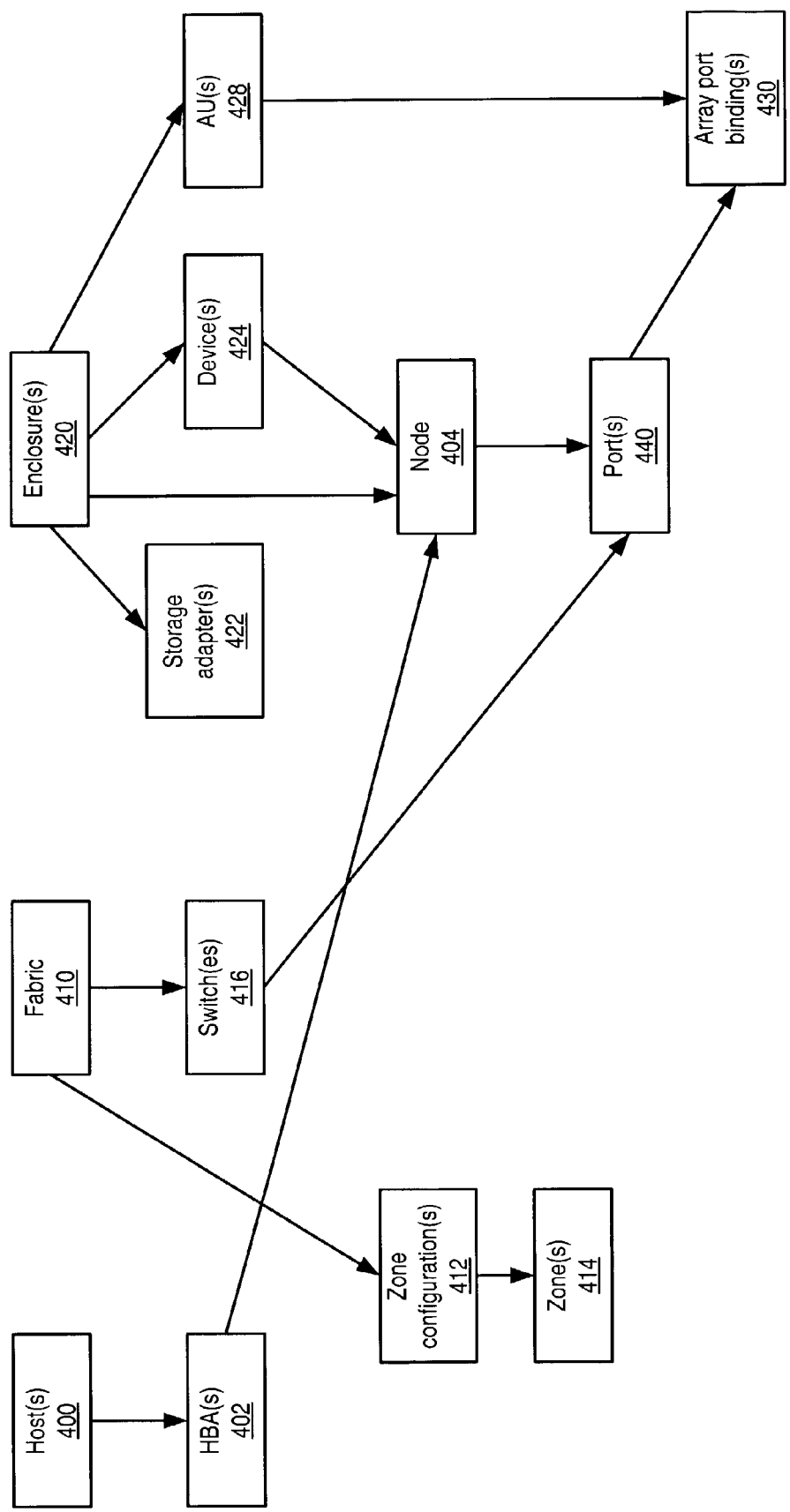
FIG. 5 illustrates an object model for the virtual SAN according to one embodiment.

FIG. 5 illustrates an object model for a virtual SAN according to one embodiment. An object model may be generated from the SAN simulator configuration information. As indicated in FIG. 5, to generate the virtual SAN, one or more objects may be generated to represent the virtual components of the SAN. In one embodiment, a root object of the list of object is the fabric object 410. In one embodiment, the fabric object 410 may be assigned a worldwide name (WWN). In one embodiment, this WWN may be predetermined. An object identifier (object ID) may be derived for the fabric object 410 from its WWN and object type. To the fabric object 410, a number of switch objects 416, enclosure objects 420, host objects 400 and storage adapters 422 as specified in the SAN simulator configuration information, as well as other types of objects, may be generated and added.

One or more zone configuration objects 412 may be generated as child objects of the fabric object 410. Each zone configuration object 412 may have one or more zone objects 414.

One or more switch objects 416 may be generated, with one or more switch ports for each switch object 416, and the switch objects 416 may be added as child objects of the fabric object 410. Switch objects 416 may be attached to one or more other switch objects 416 through switch ports, thus forming a linear chain of virtual switches. In one embodiment, except for the first and the last switch object 416 created, every switch object 416 is connected to the switch objects 416 created before and after it. In this embodiment, the first switch object 416 is connected to the switch object 416 created after it, and the last switch object 416 is attached to the switch object 416 created before it. Thus, in this embodiment, a maximum of two and a minimum of one switch port may be utilized per switch object 416 in forming this chain. In other embodiments, other organizations of the switches than the linear organization described herein may be used. In one embodiment, depending on the configured number of virtual switches and the number of switch ports per switch object 416, a WWN may be generated for each switch object 416 and switch port. In one embodiment, object IDs for switch objects 416 and switch ports may be derived from their respective WWNs and object types.

One or more host objects 400 may be generated, each with a specified number of HBA ports, and added to the fabric object 410. In one embodiment, as illustrated in FIG. 5, the host objects 400 are not child objects of the fabric object 410. For each host object 400, one or more HBA objects 402 may be generated. For each HBA object 402, one or more node objects 404 may be generated. For each node object 404, one or more HBA ports may be generated. An IP address may be generated for each host object 400. A host object 400's object ID may be generated from its WWN, object type and host name. The HBA ports may be attached to switch ports, if there are any offline. In one embodiment, the HBA objects 402 may be equally divided among available switch objects 416.

One or more enclosure objects 420 may be generated and linked to the fabric object 410. In one embodiment, as illustrated in FIG. 5, the enclosure objects 420 are not child objects of the fabric object 410. In one embodiment, an object ID of an enclosure object 420 may be derived from its object type and enclosure ID. An enclosure object 420 may have one or more storage adapter objects 422, AU objects 428 and device objects 424 as child objects. Node objects 404 and array ports may have a parent-children relationship, and in one embodiment, node objects 404 may be child objects of device objects 424. In one embodiment, node object 404 may be directly added to an enclosure object 420. Depending on the availability of offline ports, the array ports may be attached to switch ports.

In FIG. 5, rather than representing each type of port (switch ports, array ports, and HBA ports) as separate objects, port(s) 440 represents the logical communications channels that may be generated as communications channels between AUs and HBA ports in the object model of the virtual SAN.

In one embodiment, devices are connected to the switch objects 416 in a way to balance the load on the virtual switches. When a device is connected to a particular switch port, its port state is made online. In one embodiment, attachment of device ports to switch ports may follow a round-robin algorithm. For example, if an HBA object 402 has three HBA ports and there are at least three switch objects 416, then each HBA port of the HBA object 402 may be attached to a different switch object 416. In one embodiment, a similar mechanism may be used for the array ports of an enclosure object 420. When a switch port is connected to a device port, its state is changed to online. In one embodiment, every port that is connected to a switch port may be made online by setting a port state attribute for the port in the SAN simulator configuration information.

The attributes of the objects may be assigned values as indicated in the SAN simulator configuration information. In one embodiment, the WWN for all ports is generated by using a "seed" WWN. Each device may have a separate seed, and a counter may be maintained for every device. Whenever a WWN is to be generated for a particular device, its counter is added to the seed. In one embodiment, IP addresses for switches may be generated using a similar mechanism In one embodiment, the generated virtual objects may be registered in a database. In one embodiment, before entering the information into the database, a lock may be obtained for the database to prevent concurrency problems. Once the objects are listed in the database, the lock is released. This database may be a data representation of the virtual SAN as illustrated in FIG. 2, and may be accessed by the SAN access layer via the SAN simulator explorer.

In one embodiment, objects supported by the SAN simulator explorer may be defined in one or more object schema tables. In one embodiment, the schema table(s) may include one or more attributes that each object may have. To add an attribute or object to be supported by the SAN simulator explorer, entries may be made in the table(s). In one embodiment, when entering objects in the data representation (e.g. database), each object's object type is checked in the object schema table, and its attributes may be checked to verify that the object and its attributes are supported by the SAN simulator explorer for the SAN management system.

In one embodiment, to add support for new objects, the attributes for the object type may be defined in the SAN simulator configuration information, and corresponding entries may be made to the schema table(s).

One embodiment of the SAN simulator may include an API for zone management that may be used, for example, for creating and deleting virtual zones, and adding, removing and moving zone members in the virtual zones. For creating a new zone object 414, a check may be made to see if the fabric object 410 has a zone configuration object 412. If not, then a zone configuration object 412 is generated. In one embodiment, when created, the new zone object 414 is a child of the zone configuration object 412. In one embodiment, the user assigns a name to the new zone during creation.

In one embodiment, when a zone object 414 is to be deleted, its member list is emptied, its parent zone configuration object 412 is identified, and the specified zone object 414 is removed from the list of children of the zone configuration object 412. In one embodiment, adding a zone member to the zone object 414 includes adding the member object as a child of the zone object 414, and removing a zone member from a zone object includes removing the member object from the list of child objects of the zone object 414. In one embodiment, to move zone members from one zone to another zone, the member objects are removed from the list of child objects of the first zone object 414 and then added to the list of child objects of the second zone object 414.

One embodiment of the SAN simulator may include an API for LUN (logical unit number) management that may be used, for example, in performing various port binding and LUN security tasks in the virtual SAN. Port binding may be defined as binding an addressable unit (AU) to an array port, while LUN security may include adding an HBA port to the access control list of an AU through a specified array port.

In one embodiment, port binding and LUN security for the virtual SAN may be performed according to a user's specification. In one embodiment, port binding and LUN security for the virtual SAN may be performed according to a fixed algorithm which, for example, equally divides the array ports among the disk arrays, the AUs among the array ports, and so on. In one embodiment, port binding and LUN security for the virtual SAN may be performed according to a random process.

In one embodiment, to bind an AU to an array port, an array port binding object 430 may be generated. In one embodiment, an object ID for the array port binding object 430 may be generated from the object IDs of the array port and AU. The array port binding object 430 is registered in the data representation (e.g. database) and added as a child to the given AU object 428 and array port. To detach an AU from an array port, the array port binding object 430 is removed from the list of children of the given AU object and array port.

In one embodiment, an HBA port may be added to the access control list of an AU through an array port. In one embodiment, a port binding object 430 may be generated for the respective array port and AU, and a check is made to determine if the AU is bound to the array port. If the AU is not bound to the array port, then an error may be returned. If the AU is bound to the array port, the HBA port is added to the LUN access list of the port binding object 430. If the HBA port is to be removed from the access control list of an AU, then a port binding object 430 may be created for the array port and AU and the HBA port is removed from the LUN access list of the port-binding object if it exists; otherwise an error is returned.

In one embodiment, switches, enclosures and/or other objects may be added to the virtual SAN dynamically through a user interface, for example a command line interface and/or a graphical user interface (e.g. a SAN manager as described below). To add switches dynamically, the number of switches to be added, the switch ports to which the switches are to be connected, and the model names for the switches to be added may be specified. Switch objects 416 representing the switches may be generated and added to the fabric object 410. In one embodiment, vendor-specific information for the switches may be read from a file. In one embodiment, this file may include one or more records, where each record includes the vendor name, model name and firmware version for a type of switch.

To add enclosures dynamically, the model name, total number of array ports, number of storage adapters, number of address units, number of online array ports, and a list of one or more WWNs of switch ports which are to be connected to these array ports may be specified. The enclosure object 420 is generated as specified and added to the fabric object 410. In one embodiment, vendor-specific information for the enclosure may be read from a file.

Figure 6:
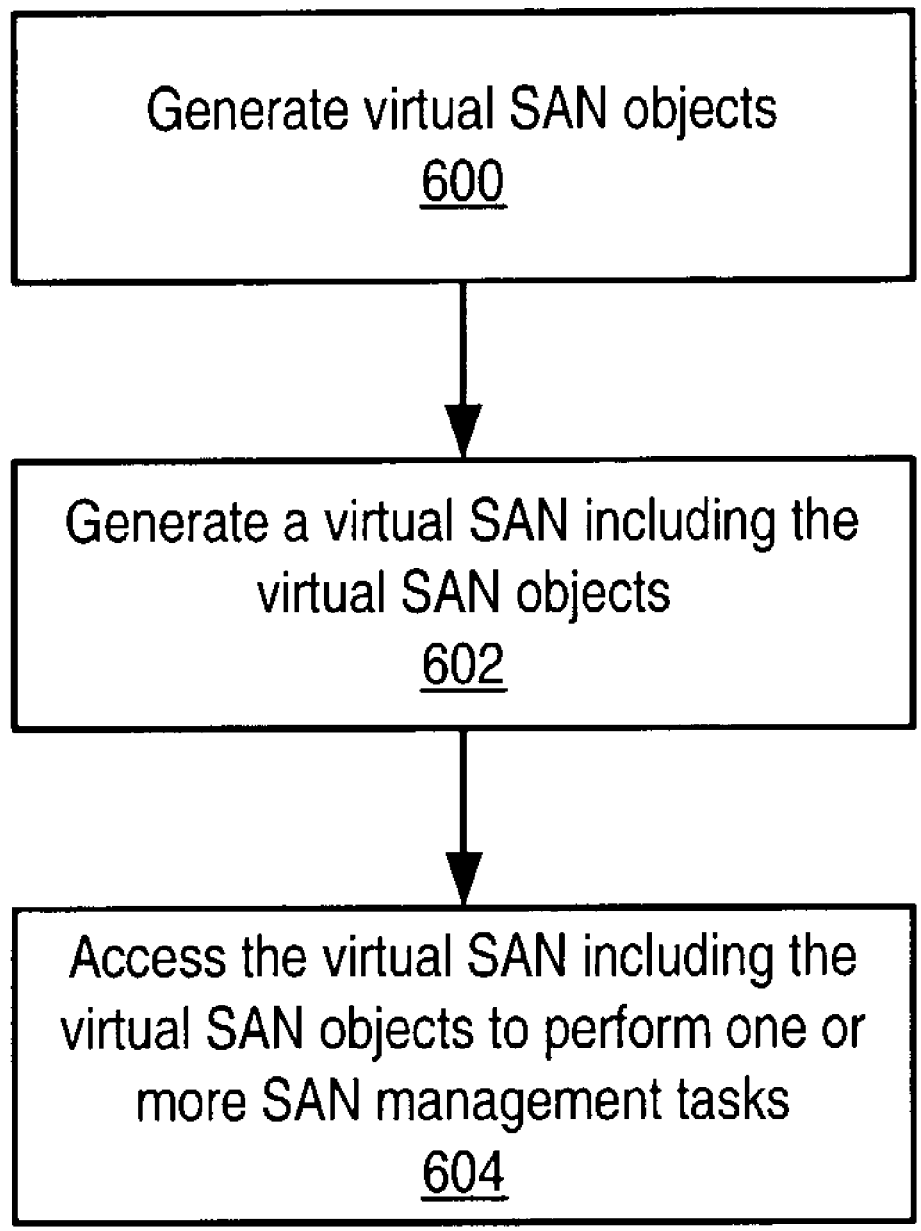
FIG. 6 is a flowchart illustrating SAN simulation according to one embodiment.

FIG. 6 is a flowchart illustrating SAN simulation according to one embodiment. As indicated at 600, a plurality of virtual SAN objects may be generated. In one embodiment, the virtual SAN objects may be generated in accordance with information describing the virtual SAN objects to be generated accessed from one or more SAN simulator configuration information files. In one embodiment, the generation of the virtual SAN objects may be performed in response to a flag set to enable the SAN simulator in a SAN management system configuration file that may be read at startup of the SAN management system.

As indicated at 602, a virtual SAN including the generated virtual SAN objects may be generated. In one embodiment, the virtual SAN is a data representation (e.g. database) including the virtual SAN objects and other information describing the SAN (e.g. relationship information among the virtual SAN objects).

In one embodiment, types of virtual SAN objects supported by the SAN simulator may be defined in one or more object schema tables. In one embodiment, the schema table(s) may include one or more attributes that virtual SAN objects of each type may have. In one embodiment, to enter a virtual SAN object in the virtual SAN data representation, each virtual SAN object's object type and attributes may be checked in the object schema table(s) to verify that the virtual SAN object as specified is supported by the SAN simulator. Virtual SAN objects that are supported may then be added to the virtual SAN data representation.

As indicated at 604, the virtual SAN may be accessed to perform SAN management tasks. In one embodiment, the virtual SAN may be accessed by a SAN management server such as that described below for the exemplary SAN management system. In one embodiment, SAN management tasks may include one or more of, but are not limited to, testing SAN software, testing SAN configurations to determine a configuration for end-user application, zone management tasks, LUN management tasks, and adding/deleting/modifying virtual SAN objects, among others. In one embodiment, SAN management tasks may include one or more of, but are not limited to, the SAN management tasks of the exemplary SAN management system described below.

One embodiment may include a SAN simulator explorer that serves as an interface between a SAN management server (such as that described below for the exemplary SAN management system) and the virtual SAN when performing SAN management tasks. In one embodiment, the SAN simulator explorer (e.g. a thread) may be started in response to a flag set to enable the SAN simulator in a SAN management system configuration file that may be read at startup of the SAN management system.

In one embodiment, a SAN management task may be initiated through user interaction with a user interface. In one embodiment, results of a SAN management task may be displayed on the user interface.

Storage Area Network (SAN) Management System

Embodiments of an exemplary centralized Storage Area Network (SAN) management system with which embodiments of the SAN simulator may be used to generate virtual SANs for testing and configuration tasks are described. Referring again to FIG. 1, embodiments of the centralized SAN management system may provide administrators with a single management interface to the complex tasks involved in managing a growing, multi-vendor SAN. Embodiments of the SAN management system may simplify and centralize the management of heterogeneous SANs to enable control of SAN resources including, but not limited to, logical volumes, fibre channel adapters, and switches 108, as well as storage devices 104. A logical volume is a virtual disk made up of logical disks. A logical disk (also referred to as a logical device) is a set of consecutively addressed FBA (Fixed Block Architecture) disk blocks that is part of a single virtual disk-to-physical disk mapping. Logical disks are normally not visible to the host environment, except during array configuration operations. A virtual disk is a set of disk blocks presented to an operating environment as a range of consecutively numbered logical blocks with disk-like storage and I/O semantics. The virtual disk is the disk array object that most closely resembles a physical disk from the operating environment's viewpoint.

The SAN management system may provide centralized management of SAN-connected devices with automatic discovery, visualization, access control, and policy-based monitoring, alerting and reporting. The SAN management system may provide a single point of management from logical unit to interconnect to SAN-connected hosts 102. A LUN (logical unit number) is the SCSI (Small Computer System Interface) identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk may have a single logical unit, or alternatively may have more than one logical unit. Tape drives and array controllers may incorporate multiple logical units to which I/O commands can be addressed. Each logical unit exported by an array controller may correspond to a virtual disk. An interconnect is a physical facility by which system elements are connected together and through which they can communicate with each other. Examples are I/O buses and networks.

The SAN management system may provide customizable, intuitive views into a SAN based on host 102, device, fabric 100, or storage groups, as well as real-time alerts to diagnose and avoid outages. By masking the administrative complexity of the SAN environment, the SAN management system may allow the potential of SANs to be realized.

SAN management may occur at two levels—physical and logical—to maintain control, regardless of the underlying device environment. With the discovery of host attributes like OS platform, OS handles and IP address, the critical link associating logical devices to a host 102 and its applications may be made. The SAN management system may provide this data-centric management from host applications through interconnects to the storage resources, regardless of the underlying hardware and operating system(s).

Embodiments of the SAN management system may provide features for managing SAN environments, including one or more of, but not limited to: automatic SAN discovery, SAN visualization, inventory reporting; physical and/or logical mapping of storage resources to host applications; logical storage grouping and capacity reporting to aid in the effective allocation of storage; storage virtualization; centralized event management for facilitating SAN device performance and availability; user-customizable policy management; and real-time and/or historical performance data for Quality-of-Service (QoS) reporting.

One embodiment of the SAN management system may include, but is not limited to, a SAN management server 200 and one or more SAN managers 202. The SAN management server 200 may discover SAN objects and their attributes, and may provide event management, policy management, and notification services. The SAN management server may explore the SAN to make data available to client applications, including SAN manager 202. Embodiments of the SAN management server 200 may run in a variety of systems, including, but not limited to, Solaris 2.6, 7 or 8, Microsoft Windows NT 4.0 (Server and Enterprise Server), and Microsoft Windows 2000 (Server, Advanced Server and Datacenter Editions).

The SAN manager 202 is a client application provided with the SAN management system. The SAN manager 202 may provide a graphical user interface for displaying the information (e.g. XML data) compiled by and received from the SAN management server 200 in graphical and/or textual format, and may provide a user interface for the SAN administrator to access various features of the SAN management system such as tools and utilities described herein to perform functions of the SAN management system. SAN manager 202 may run on any of a variety of end-user platforms coupled to one or more of the hosts 102, for example via a LAN or WAN, or alternatively may run on one of the hosts 102, including the host 102 that includes the SAN management server 200.

One embodiment may include an integrated volume manager that may provide capabilities including, but not limited to, pooling storage across multiple heterogeneous arrays on the SAN. The SAN management system may automatically discover and display volumes within its interface. Additionally, adding storage to a host may be streamlined though the SAN management system. In one embodiment, when zoning storage to a host, the SAN management system may automatically initiate an operating system rescan so that the new device is immediately available for use by the volume manager on the host. This may be performed without user intervention at the operating system level, saving time and ensuring that the resource can be used immediately.

Embodiments of the SAN management system may provide accurate discovery, visualization and inventory reporting in the SAN environment. Embodiments may reduce or eliminate the manual task of tracking of devices and their connections in the SAN by automatically discovering the physical and logical connections of the SAN, displaying the information in a graphical topology map and logging the data in a variety of inventory reports. Using both in-band and out-of-band protocols, and leveraging industry standards, the SAN management system may automatically capture and display details, including, but not limited to, device driver version, firmware level, status, performance, free and in-use port count, hardware manufacturer, model number and worldwide name (WWN). In-band refers to transmission of a protocol other than the primary data protocol over the same medium (e.g. Fibre Channel) as the primary data protocol. Management protocols are a common example of in-band protocols. Out-of-band refers to transmission of management information for Fibre Channel components outside of the Fibre Channel network, for example over Ethernet. In one embodiment, a storage administrator may assign customized attributes to devices in the SAN for use in tracking information such as physical location, account code, installation date and asset tag number.

One embodiment of the SAN management system may enable the automatic discovery of SAN resources using one or more in-band and/or out-of-band protocols and industry standards (e.g. MS/CT, GS-3, SNMP, Fibre Alliance MIB, ANSI T11, vendor-specific extensions, etc.). This embodiment may reduce or eliminate the need for manual tracking of SAN components.

One embodiment of the SAN management system may provide a policy management service that may allow SAN environments to be customized to define what parameters are monitored and how they should be responded to through notification and action options such as e-mail, command line scripts, PERL scripts, and/or SNMP traps. One embodiment of the SAN management system may include a customizable policy service for intelligent threshold-based monitoring for SAN performance, status, availability and/or traffic. The SAN management system may provide policies for SAN objects to assist the user in maintaining SAN operations within user-defined parameters. The SAN management system may automatically monitor switch and storage resources, keep environment, error and traffic statistics, and provide automated capabilities. One embodiment may provide one or more policies based on the knowledge of various SAN hardware providers. Standard reports may also be provided, for example to support common storage service-level agreements.

One embodiment of the SAN management system may provide a real-time alert viewer that may monitor heterogeneous device status, and may provide proactive management capabilities in the SAN environment. By supplying policies on SAN devices, the SAN management system may monitor the status and performance of the device(s) and generate alerts when behavior falls outside acceptable user-defined boundaries. The SAN management system may enable intelligent monitoring through user-definable threshold levels that can take actions automatically as well as notify administrators of critical events in real time.

The SAN management system may provide a central management interface for various SAN management tasks. If vendor-specific management is desired (e.g. for firmware updates), the SAN management system may provide in-context launch support for element managers supplied by the device vendor. In one embodiment, to directly manage a device, the administrator may telnet to the device through the SAN manager user interface.

In one embodiment, the SAN manager 202 may provide a graphical user interface (GUI) through which the SAN management system facilitates management by allowing the user to graphically drill down into the logical and physical devices on the SAN. One embodiment may provide the ability to zoom in or out on areas of interest in a SAN topology map to simplify the navigation of a growing enterprise SAN. Within the topology map, integrated tool tips may be provided to help identify devices and paths in the SAN without having to navigate through a complex topology. Information on SAN devices, such as hosts 102 with Host Bus Adapters (HBAs), interconnects, and storage devices 104, may be displayed in context in the GUI, revealing resources in zones as they are physically and logically connected. One embodiment may include a search mechanism. For example, if the administrator wants to ensure that all interconnects in the SAN are at the same firmware level, the administrator may query an integrated search tool for firmware levels to automatically locate all the devices that match the search criteria for the specific firmware level.

Embodiments of the SAN management system may provide both real-time and historical performance data for critical service-level parameters such as connectivity, available space and throughput. Through real-time performance monitoring, with flexible user-defined thresholds, one embodiment may notify administrators about issues that could affect overall SAN performance before the issues have an impact. Logging this data for reporting may, for example, extend the administrator's capability to audit and validate service-level agreements.

One embodiment of the SAN management system may enable real-time performance charting of SAN devices. The SAN management system may monitor interconnect and storage devices in real time, and may be used to display information about the various SAN devices such as current load/status. The SAN management system may provide a troubleshooting platform for problem resolution.

Embodiments of the SAN management system may provide detailed capacity reports to aid in growth planning and gathers detailed information for use in chargeback reports. One embodiment may track LUN allocation to hosts as well as to storage groups, distilling real-time and historical reports that show where storage resources are being consumed.

In one embodiment, the SAN management system may run on all SAN-attached hosts 102. However, in some embodiments some hosts may not be able to run the SAN management system. For these hosts, the SAN management system may automatically discover and display these hosts with a limited view of the SAN from the hosts' view.

Figure 7:
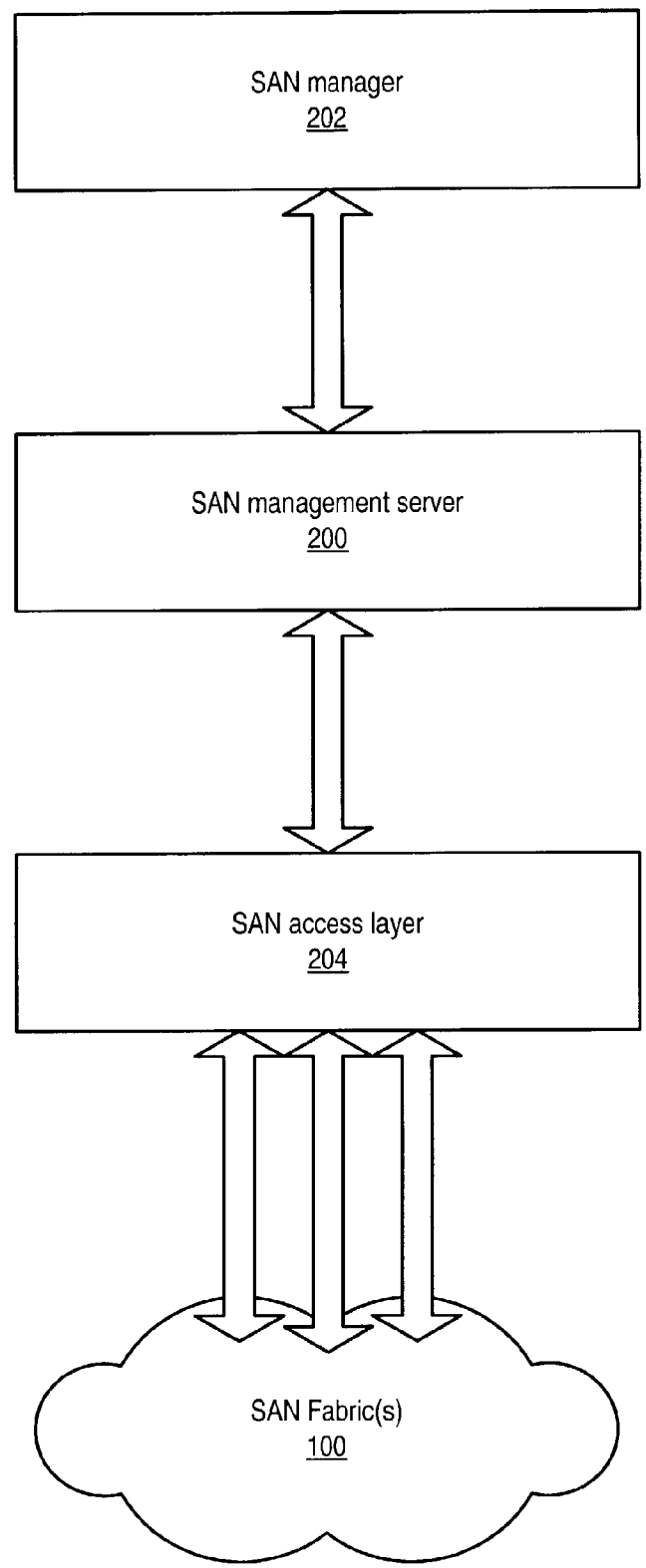
FIG. 7 illustrates the architecture of the SAN management system according to one embodiment.

FIG. 7 illustrates the architecture of the SAN management system according to one embodiment. In some embodiments, the SAN management system may provide administrators or other users the ability to view complex SAN topologies, gather real-time information about SAN objects, and support zoning and LUN security from one central point. This embodiment may be based on a distributed client-server architecture, and may be divided into components which may include a SAN manager 202, a SAN management server 200, and a SAN access layer 204. In one embodiment, the SAN access layer 204 may be a component or "layer" of the SAN management server 200.

The SAN manager 202 is a client application provided with the SAN management system. The SAN manager 202 may provide an interface for taking advantage of many or all of the SAN management system capabilities. In one embodiment, the SAN manager 202 provides a graphical user interface for displaying the information (e.g. XML data) compiled by and received from the SAN access layer 204 and the SAN management server 200 in graphical and/or textual format. The SAN manager 202 may be a central point for the user to perform one or more of SAN management task including, but not limited to, administering the SAN, viewing topographical displays of discovered objects on the SAN, accessing detailed information on components including object attributes and connectivity, creating and modifying policies, administering access control through zoning and LUN security, monitoring SAN events including real-time alerts, allocating storage resources, generating and viewing inventory and performance reports, generating and viewing real-time and historical reports, and/or launching utilities, tools and applications, which may include third-party management tools.

Embodiments of the SAN manager 202 may provide a user interface for various tools, utilities and/or functions of the SAN management system. Embodiments of the SAN manager 202 may include an enclosure utility for creating and managing SAN object enclosures. Embodiments of the SAN manager 202 may include a zone utility for simplified zoning management. Embodiments of the SAN manager 202 may include a policy utility for configuring automated responses to SAN conditions. Embodiments of the SAN manager 202 may include a reporter mechanism for generating and displaying user-defined and/or predefined reports on various aspects of the SAN. Embodiments of the SAN manager 202 may include a group utility for defining and naming groups of SAN objects based on quality of service (QoS) criteria. Embodiments of the SAN manager 202 may include a LUN security utility for LUN management. Embodiments of the SAN manager 202 may include a LUN query tool that may query discovered LUNs based on user-specified quality of service criteria and provide input to the zone utility and group utility.

In one embodiment, other applications, such as a Web browser, may function as clients to the SAN management server 200. In one embodiment, multiple SAN managers 202 may connect simultaneously with the SAN management server 200 using a TCP/IP socket assigned to the SAN access layer 204 and the policy service.

The SAN management server 200 may provide discovery of SAN objects and their attributes, event and policy management, and/or notification services. The SAN management server 200 may explore the SAN to make data available to client applications. The functions of the SAN management server 200 may include one or more of, but are not limited to: automatically discovering SAN-attached objects including hosts, host bus adapters (HBAs), switches and storage devices; maintaining a data store/database of real-time object information; managing SAN resources through zoning and LUN access control; monitoring conditions on the SAN; performing policy-based actions in response to SAN conditions; generating inventory and performance reports; and supporting user-defined grouping of objects based on quality of service (QoS) criteria.

SAN management system administration may include determining that the SAN management server 200 is configured to discover and monitor devices on the SAN. In one embodiment, the SAN management system may provide discovery methods that require minimal maintenance, and may provide a SAN configuration utility.

The component of the SAN management system that manages SAN discovery is the SAN access layer 204. Functions of the SAN access layer 204 may include discovery and zoning. By discovering objects and the relationship of these objects to each other, the SAN access layer 204 maintains a real-time topology of the SAN. The SAN access layer 204 may also directly interface with switches on one or more fabrics to manage the zoning of storage resources. The SAN access layer 204 may discover additional information about objects on the SAN that the SAN management server 200 cannot discover directly (e.g. devices configured out of view of the SAN management server 200), such as devices on a separate zone or fabric 100.

Figure 8:
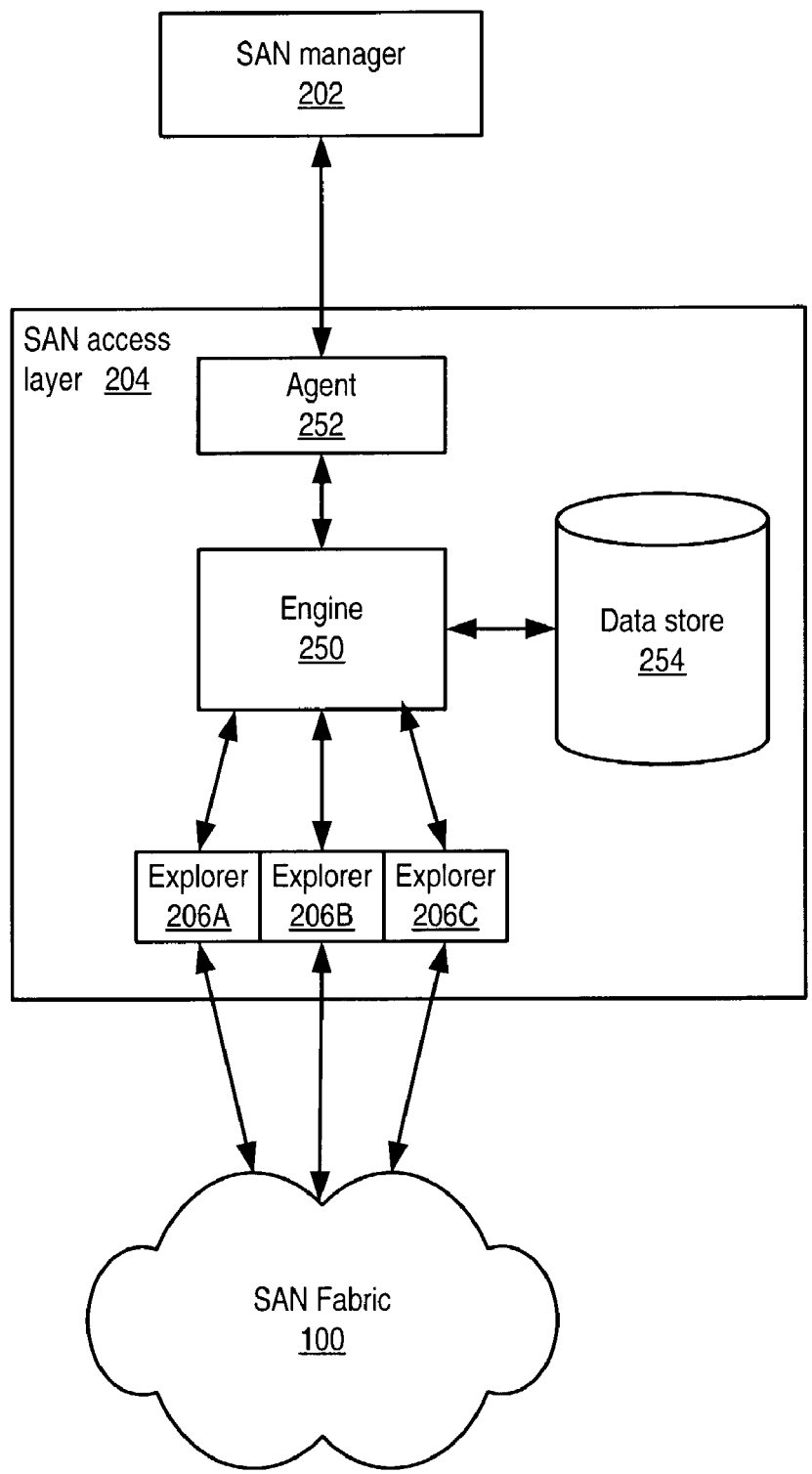
FIG. 8 illustrates the architecture of the SAN access layer according to one embodiment.

FIG. 8 illustrates the architecture of the SAN access layer 204 according to one embodiment. The SAN access layer 204 may include one or more components, including, but not limited to, one or more explorers 206 (e.g. explorers 206A, 206B, and 206C), an engine 250, an agent 252, and a data store 254. In one embodiment, the SAN access layer 204 may include an engine 250 that may perform one or more functions which may include, but are not limited to, coordinating the activity of the explorers 206, managing changes to the data store 254, and performing zoning operations by communicating with switches on the SAN fabric 100.

In one embodiment, the SAN access layer 204 may include one or more explorers that provide an interface to different types of heterogeneous SAN components so that the SAN management system may provide a common data representation for heterogeneous SAN components. Explorers may communicate with the SAN components over Fibre Channel (in-band) and/or Ethernet (out-of-band) connections to inventory the SAN. Each explorer may communicate with a specific type of device using a protocol available for that specific type of device.

In one embodiment, data gathered by the explorers may be aggregated into data store 254, which may be updated with real-time information about objects on the SAN. Once the SAN is discovered, the SAN access layer 204 may continue to monitor the SAN and may update the data store 254 as new events occur on the SAN. In one embodiment, the SAN access layer 204 may periodically examine the SAN, for example to discover or determine objects that are added, objects that are removed, and connections that are pulled. In one embodiment, the data store 254 may be managed by the SAN access layer engine 250. In one embodiment, the data store 254 may be an embedded, ODBC-compliant, relational database. In one embodiment, data from the database may be imported into a data warehouse to track changes and analyze the SAN over periods. In one embodiment, the data store 254 may be purged, for example when a fabric switch is rebooted or to capture fresh SAN discovery information. Purging the data store 254 may result in the loss of user-entered data such as manually configured hosts and object attributes. An alternative to purging the data store 254 is to delete individual objects using the SAN manager 202. Objects that are discoverable by the SAN access layer 204 may be added back into the data store automatically.

In one embodiment, the SAN access layer 204 may include an agent 252 that translates information from the data store 254 into formatted files (e.g. XML files), which may be provided to client applications such as the SAN manager 202 or Web browsers. The agent may also enforce user authentication for commands sent to the SAN management server 200, and may handle communication between the SAN management server 200 and any hosts running a SAN access layer remote (described below).

In one embodiment, the SAN manager 202 is a client of the SAN access layer 204, and may graphically and/or textually display objects discovered by the SAN access layer 204. In one embodiment, the SAN manager 202 may open a connection (e.g. TCP/IP socket) with the SAN access layer agent 252 and send a message (e.g. an XML message) requesting data stored in the data store 254. Upon receiving the request, the SAN access layer engine 250 may dynamically create a document (e.g. an XML document) describing the SAN topology. The SAN access layer agent 252 then may send this document to the SAN manager 202. Once the SAN manager 202 successfully receives the message, the SAN access layer agent 252 may close the connection. When the SAN manager 202 receives the document, it may read the file and display, in graphical and/or textual format, the information the document provides about the SAN.

In one embodiment, users may manually initiate an update between the SAN manager 202 and the SAN access layer 204. In one embodiment, any change on the SAN may cause an update to the SAN manager 202. In one embodiment, to minimize the network load during an update, only the changes are sent to the SAN manager 202.

In one embodiment, the data generated by the SAN access layer 204 may be in a format (e.g. XML) that may be read by a Web browser or exported to a file that may be opened and edited using a standard text editor. In one embodiment, a SAN's current state may be captured in a file, e.g. an XML or other markup language file. Thus, snapshots of the SAN may be saved over time, which may be analyzed and compared to current conditions on the "live" SAN.

Figure 9:
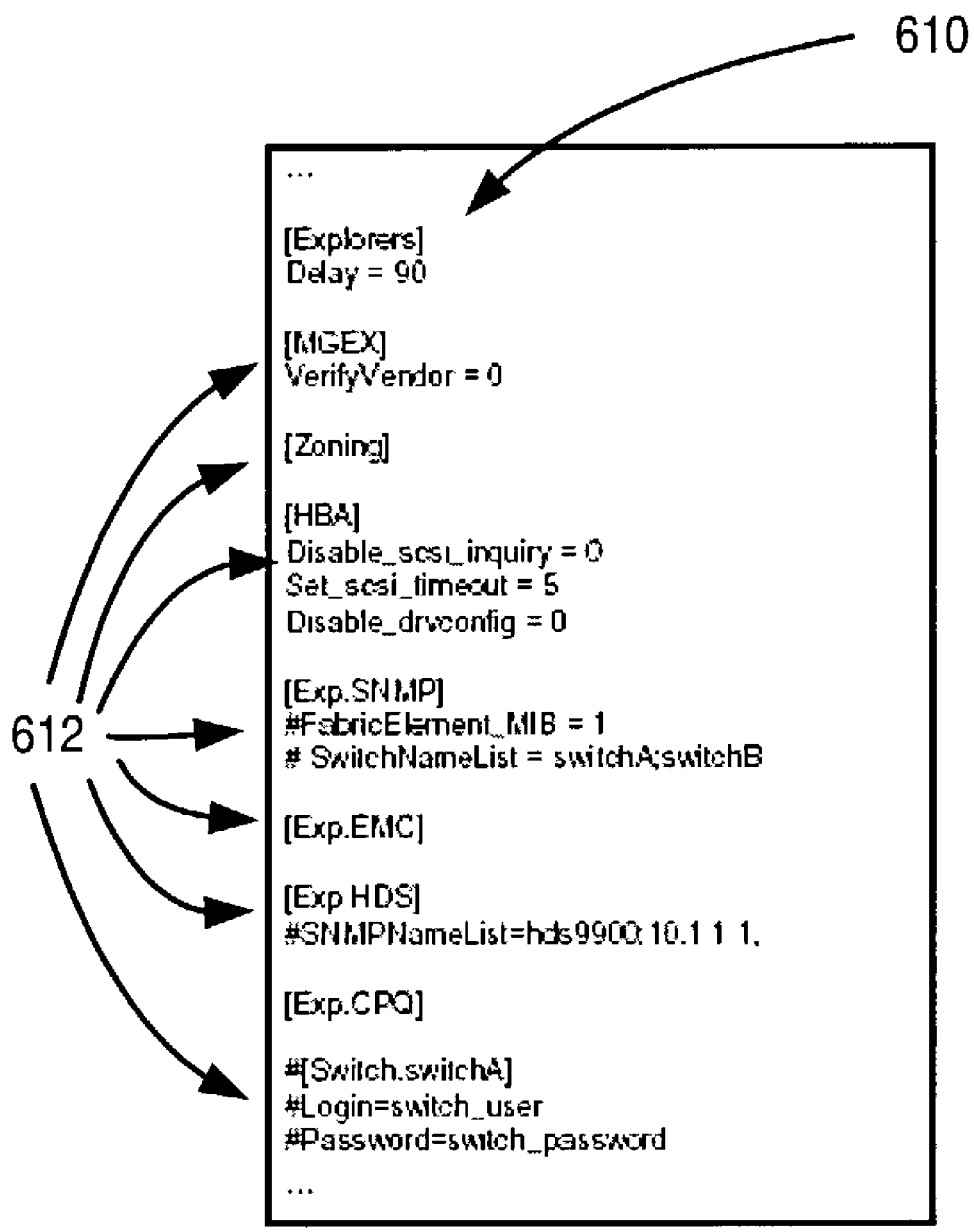
FIG. 9 illustrates an exemplary SAN access layer configuration file according to one embodiment.

In one embodiment, the SAN access layer 204 may be configured for discovery and device communication through a configuration file. FIG. 9 illustrates an exemplary SAN access layer configuration file according to one embodiment. The configuration file may include one or more parameters 610 for the SAN access layer and/or globally to the explorers. In this example, a "delay" parameter may specify the time delay (e.g., in seconds) between executions of the explorers. Each type of explorer may have a section 612 in the configuration file that may include one or more parameters specific to the particular type of explorer.

Figure 10:
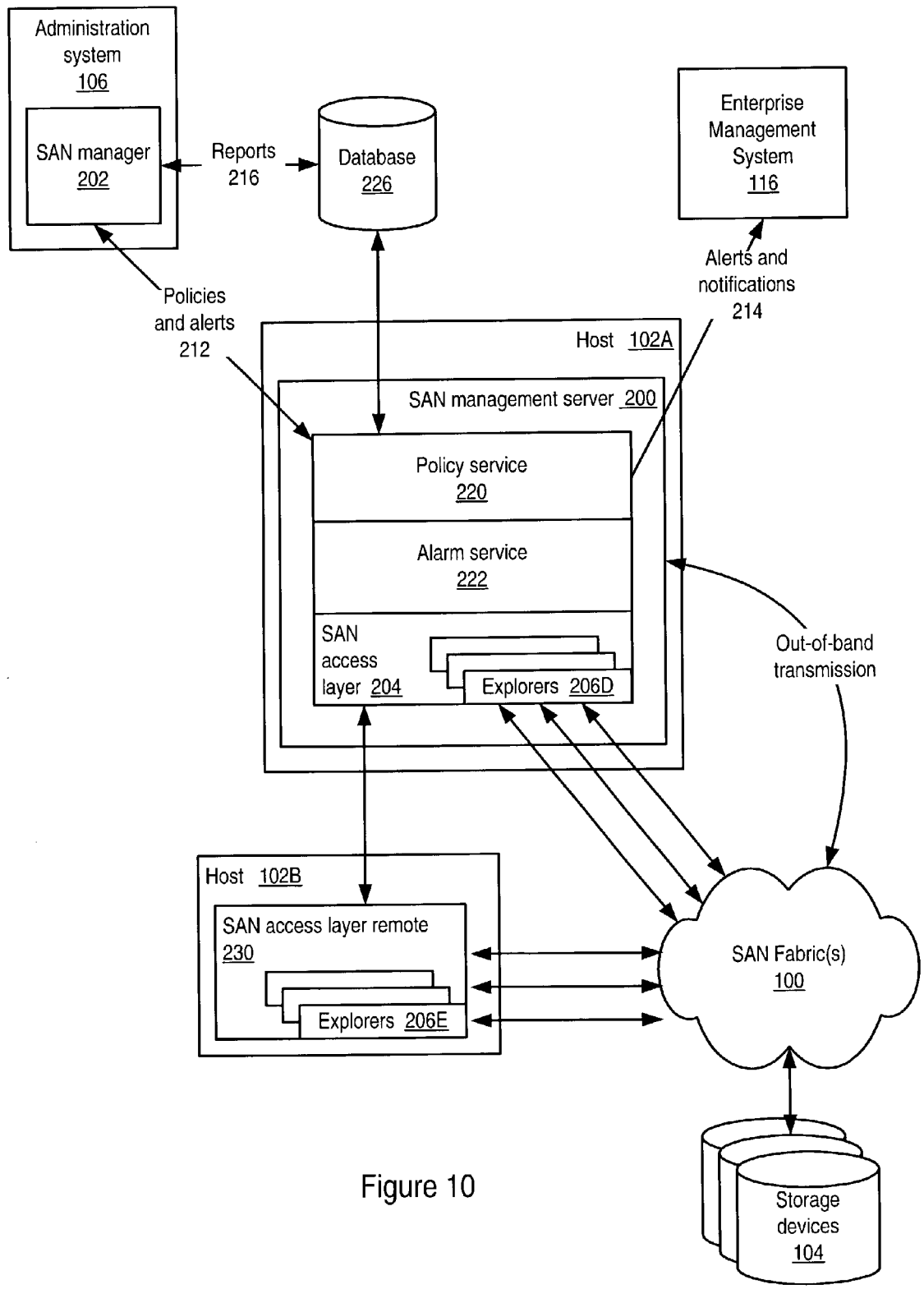
FIG. 10 illustrates an exemplary SAN including a SAN management system and further illustrates the architecture and operation of the SAN management system according to one embodiment.

FIG. 10 illustrates an exemplary SAN including a SAN management system and further illustrates the architecture and operation of the SAN management system according to one embodiment. This embodiment may be based on a distributed client-server architecture, and may be divided into components which may include a SAN manager 202, a SAN management server 200, a SAN access layer 204 and a database 226. In this embodiment, the SAN access layer 204 may be a component or "layer" of the SAN management server 200. The SAN management server 200 may also include a policy service 220 and an alarm service 222.

In one embodiment, the SAN management system may include one or more explorers 206 that provide an interface to different types of heterogeneous SAN components so that the SAN management system may provide a common data representation for the heterogeneous SAN components. In one embodiment, one or more explorers 206D may be included within the SAN access layer 204. One embodiment may include one or more SAN access layer remotes 230 (described below), which each may include one or more explorers 206E.

Explorers 206 may communicate with the SAN components over Fibre Channel (in-band) and/or Ethernet (out-of-band) connections to inventory the SAN. Each explorer 206 may communicate with a specific type of device, using a protocol available for that specific type of device. In one embodiment, the SAN access layer 204 may aggregate information gathered by the explorers 206 into a SAN access layer 204 data store. Once the SAN is discovered, the SAN access layer 204 may continue to monitor the SAN. In one embodiment, the SAN access layer 204 may periodically examine the SAN for objects that are added, objects that are removed, and connections that are pulled. In one embodiment, the architecture of the SAN management system may allow new explorers 206 to be added as needed or desired. For example, if a new type of SAN device is added to the SAN, or an existing type of SAN device is modified or upgraded, an explorer 206 may be added or updated to correctly communicate with the new or updated type of SAN device.

Each explorer 206 may use a different method to discover information about objects on the SAN. Explorers 206 may be categorized into types, including, but not limited to, switch explorers, zoning explorers, disk array explorers, and Host Bus Adapter (HBA) explorers. In one embodiment, the explorers 206 may query objects on the SAN to retrieve a standard set of attributes for each type of object. The terms "information" and "details" may be used to describe the different kinds of data about a SAN that the SAN management system may discover, including, but not limited to, SAN events, zone memberships, connectivity, etc. The term "attributes" refers to a subset of that larger body of information. Attributes are details that are particular to a type of object, such as a switch—details such as its vendor, model number, firmware version, port count, World Wide Name (WWN), and out-of-band address.

Switch explorers may discover switch information such as vendor name, firmware version, and model name. Switch explorers may include, but are not limited to, a management server explorer and an out-of-band switch explorer.

In one embodiment, the SAN access layer 204 may include a management server explorer to communicate with supported switches over Fibre Channel connections. In one embodiment, the management server explorer may use the Fibre Channel Common Transport (CT) protocol to communicate with switches in the fabric 100. The management server explorer may, for example, discover switches in-band over Fibre Channel, obtain switch characteristics, and/or explore port connectivity. In one embodiment, the management server explorer may optionally run over IP networks, for example to discover Brocade fabrics. For some switches such as Brocade switches, the management server explorer may run out-of-band. In one embodiment, the management server explorer may also perform in-band zoning (e.g. for McDATA switches).

In one embodiment, there may be circumstances in which out-of-band exploration may be desired, for example, when there are multiple switch fabrics (e.g. McDATA switch fabrics) or unsupported HBA drivers. In one embodiment, the SAN access layer may include an out-of-band switch explorer to communicate with switches (or their proxies) over Ethernet. In one embodiment, the out-of-band switch explorer may discover devices managed over any IP network. In one embodiment, the out-of-band switch explorer may use SNMP (Simple Network Management Protocol). SNMP is a protocol for monitoring and managing systems and devices in a network. The data being monitored and managed is defined by a MIB (Management Information Base), the specification and formal description of a set of objects and variables that can be read and possibly written using the SNMP protocol. Some embodiments may use other network protocols, for example Common Management Information Protocol (CMIP), Remote Monitoring (RMON), etc. Enabling the out-of-band switch explorer may include specifying IP addresses for each switch (or for multiple switch fabrics, each proxy) in a SAN access layer configuration file.

Embodiments of the SAN access layer 204 may include zoning explorers that may be used as an interface for the SAN access layer 204 to communicate with fabric switches to perform discovery and control of zones in the SAN. When SAN management system users issue zoning commands, the SAN access layer 204 may use a zoning explorer to contact the switch to perform the zoning operation. In one embodiment, the zoning explorers may communicate with the switches out-of-band. Embodiments may provide zoning explorers specific to fabric switches provided by various switch vendors such as QLogic, INRANGE, McDATA and Brocade. In one embodiment, one or more zoning explorers (e.g., a Brocade zoning explorer) may complete transactions with a switch management server (name server) to discover zone names and attributes and to perform switch zoning commands. In one embodiment, the management server explorer may, in addition to discovery, also manage zoning for some vendors' switches in-band, for example, McDATA switches.

In one embodiment, the SAN access layer 204 may include an HBA explorer that may discover information about SAN-connected storage devices 104 that are zoned to a host 102 that is running a SAN management server 200 or where a SAN access layer remote 230 (described below) resides. The HBA explorer may interact with a host 102 (e.g. a Sun Solaris or Windows 2000/Windows NT Server) to discover HBAs and device paths. A device path may be defined as a route through an interconnect that allows two (or more) devices to communicate. In one embodiment, the HBA explorer may not discover locally attached storage (e.g. disks or other devices attached through a SCSI or IDE controller). If these storage devices have OS handles, then the HBA explorer may return LUN names and attributes. An OS handle is the name the operating system uses to identify a storage resource (known as an Addressable Unit, or AU), and the correct methods (e.g. driver/system call) to access the storage resource. If no OS handles are available, then the HBA explorer may identify the device as a generic device (a block device attached to a port on the host).

Embodiments of the SAN access layer 204 may include one or more disk array explorers that may provide information about array names and their attributes, such as number of ports and the number of disks contained in an array. Disk array explorers may discover disk arrays/enclosures and their LUNs. Disk array explorers may pass along SAN management system LUN management commands to the array's management interface to execute. In one embodiment, disk array explorers may discover LUNs that are not masked to discovered hosts on the SAN. The SAN access layer 204 may include disk array explorers specific to disk arrays of various vendors, including, but not limited to, Compaq, EMC, and Hitachi disk arrays.

In one embodiment, the SAN access layer 204 may not communicate directly with a disk array but instead may communicate through the array's management interface, for example, Command Scriptor (Compaq) and SYMCLI (EMC). In one embodiment, the array vendor's management software is installed on a host 102 with an in-band connection to the arrays to be managed. The management software may provide a unified interface/command interpreter between the SAN management system and the arrays on the fabric. In one embodiment, a SAN management server 200 or a SAN access layer remote 230 is installed on the host 102 that is running the management software in order for the SAN management system to communicate with the arrays.

In one embodiment, disk array explorers (e.g. Compaq and EMC explorers) may start when the SAN access layer 204 starts. In one embodiment, the disk array explorers may check to see if the host 102 has the management interfaces (e.g. CCS or SYMCLI). If the host does not have the management interface, then the corresponding explorer may be disabled. If the management interfaces are present, then the explorers may attempt to determine if the host has access to any LUNs exported by the array. If any LUNs are available, the explorers may attempt to discover the array using the OS handle to the LUN.

In one embodiment, some disk array explorers (e.g., a Hitachi explorer) may use a different model than other explorers such as Compaq and EMC explorers. Going out-of-band, these explorers may use a network protocol such as SNMP to communicate directly with the disk array controller (e.g. the Hitachi disk array controller). IP addresses for each disk array may be supplied for SAN access layer 204 discovery and communication. For example, in one embodiment, for the SAN access layer 204 to discover and make LUN management requests using the Hitachi explorer, the IP addresses of the agent (e.g. SNMP agent) residing on each Hitachi disk array may be specified in the SAN access layer 204 configuration file.

In one embodiment, the SAN access layer 204 may automatically discover information for each Addressable Unit (LUN) that is under the control of a volume manager. The discovered information may include, but is not limited to: Disk Group Name, Disk Media Host, Disk Media I/O Paths, Disk Media Public Capacity, and Disk Name.

In one embodiment, the SAN management server 200 may discover information about HBAs on other hosts 102 attached to fabrics 100 discovered by the SAN management server host 102A. Since not all objects on the SAN may be visible to the host 102A on which the SAN management server 200 is installed, one embodiment may include a SAN access layer remote 230 that may be installed on one or more other hosts 102 in the SAN, if any, to assist the SAN management server 200 in discovering the entire SAN.

In one embodiment including SAN access layer remote 230, each installation of the SAN access layer remote 230 may include one or more explorers 206E. In one embodiment, explorers 206E may include one or more explorers 206 that may also be used by the SAN access layer 204, such as a management server explorer and an HBA explorer. In one embodiment, explorers 206E may also include an out-of-band switch explorer. In one embodiment, the SAN access layer 204 and each installation of the SAN access layer remote 230 may each include a set of one or more explorers 206 that may be determined by the discovery requirements and/or contents of the region of the SAN visible to the host 102 on which the SAN access layer 204 or SAN access layer remote 230 resides. Each installation of the SAN access layer remote 230 may provide information gathered by its explorers 206E to the SAN access layer 204, which may aggregate this information into the SAN access layer 204 data store. Installed SAN access layer remotes 230 may be considered agents or extensions of the SAN access layer 204. Where SAN access layer 204 is described herein, the description may generally be considered to include the SAN access layer remote 230.

In one embodiment, to get more detailed information about a remote host 102, the SAN access layer remote 230 may be installed on the host 102, and the host 102 may be added to a SAN access layer configuration file on the SAN management server 200. In one embodiment, to obtain SAN discovery information from fabrics 100 not attached to the SAN management server 200, the SAN access layer remote 230 may be installed on at least one host 102 in the remote fabric 100, and the at least one host 102 in the remote fabric may be added to the SAN access layer configuration file on the SAN management server 200.

In one embodiment a host 102 running the SAN access layer remote 230 may be specified as either a "Host" or an "In-Band Host" in the SAN access layer configuration file. The "Host" entry may be used to define other hosts 102 attached to the SAN. The "Host" designation may instruct the remote host 102 to run the HBA explorer. The "In-Band Host" entry may be used to define at least one SAN access layer remote host 102 per each fabric 100 that is not attached to and thus not discovered by the SAN management server 200. The "In-Band Host" designation may instruct the remote host 102 to run the management server explorer, or optionally other explorers, in addition to the HBA explorer.

In one embodiment, the SAN management server 200 communicates with SAN access layer remote(s) 230 across an HTTP connection. In one embodiment, the SAN management server 200 may use XML to communicate with SAN access layer remote(s) 230. Other embodiments may use other connections and other communications protocols.

Figure 11:
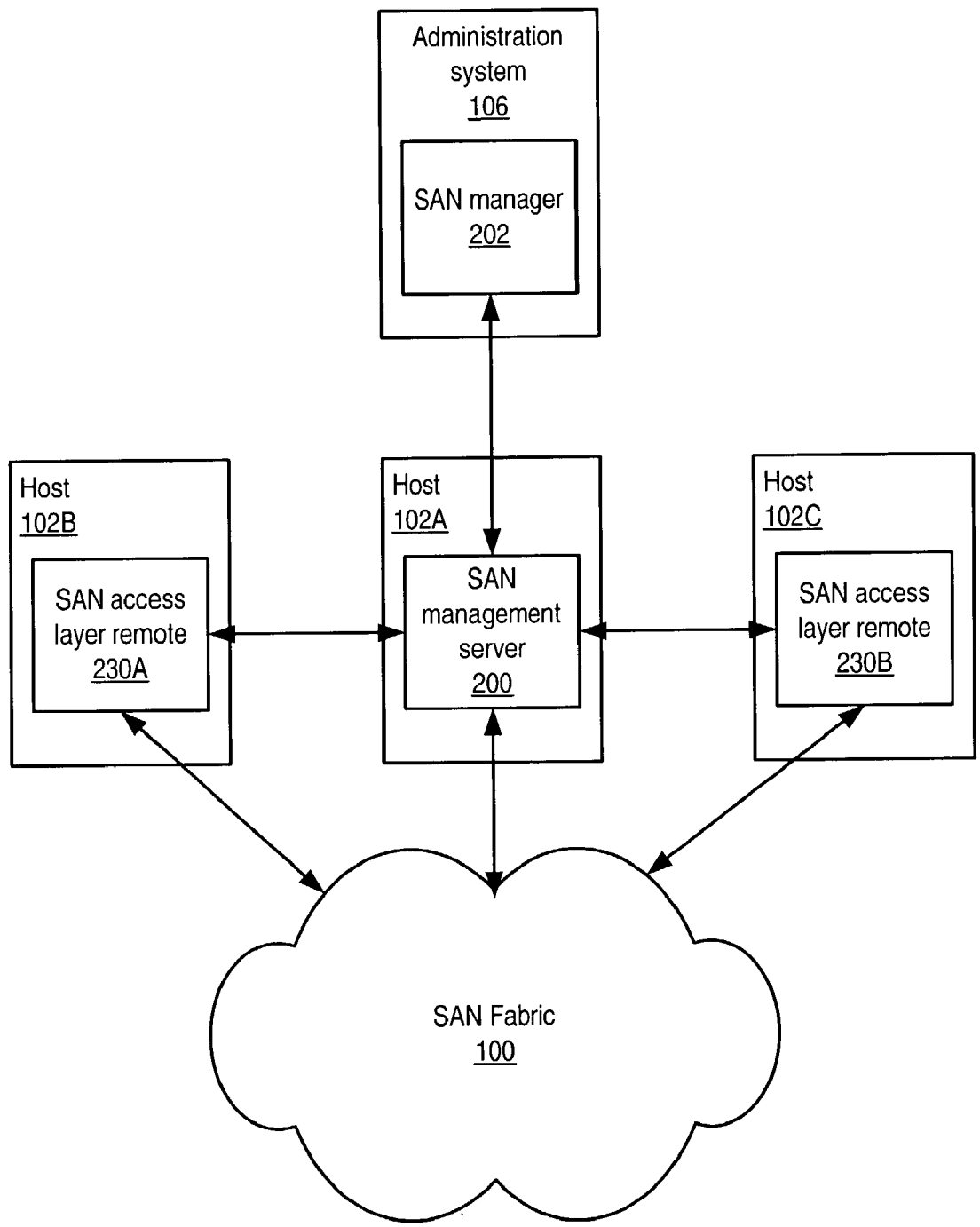
FIG. 11 illustrates an exemplary SAN where a first host includes a SAN management server and other hosts each include an installation of the SAN access layer remote according to one embodiment.

In one embodiment, the SAN access layer remote 230 may be installed on every host 102 on the SAN to provide complete and accurate discovery. In one embodiment, the SAN access layer remote 230 may not be installed on the same host 102 as the SAN management server 200. FIG. 11 illustrates an exemplary SAN where host 102A includes a SAN management server 200 and hosts 102B and 102C each include an installation of the SAN access layer remote 230 according to one embodiment. In one embodiment, the SAN access layer remote 230 may use a modified form of the same SAN access layer process used in the SAN management server 200, but is not itself a server. In one embodiment, client applications such as the SAN manager 202 may not connect to a SAN access layer remote host such as hosts 102B and 102C. In one embodiment, if a the SAN access layer remote 230 is not installed on a host 102, the SAN management server 200 may still discover the HBA, and the enclosure utility may be used to accurately visualize the host in the SAN manager 202 user interface.

In one embodiment, the SAN management system may discover at least some storage enclosures automatically, but in some cases, the SAN management system may discover only the individual storage devices inside the enclosure. For enclosures that are not discoverable, the SAN management system may provide an enclosure utility that may be used to manually create a representation of an enclosure object in the SAN management server data store. In one embodiment, the enclosure utility may be provided through the SAN manager. Using the enclosure utility, the SAN administrator or other user may create an enclosure by specifying the type of enclosure and which devices are contained within it.

Monitoring a SAN

Continuing with FIG. 10, in one embodiment, policy-based management provided by the SAN management system enables the monitoring of conditions on a SAN and may facilitate quick response when problems occur. Conditions that may be monitored by the SAN management system may fall into one or more categories of interest to storage administrators, including, but not limited to, traffic on the SAN, the environment status of the SAN's hosts, switches, and disk arrays, errors the SAN is generating, and availability of ports and switches on the fabric.

Embodiments of the SAN management system may use one or more methods for monitoring conditions on a SAN. These methods may include, but are not limited to, out-of-band polling (e.g. SNMP polling), traps (e.g. SNMP traps), and the SAN access layer 204. In one embodiment, to monitor conditions on a SAN using SNMP polling, the SAN management system may periodically poll SNMP-enabled SAN devices to retrieve the current values of the properties defined in their vendor-supplied SNMP Management Information Bases (MIBs). To monitor conditions on a SAN using SNMP traps, some SAN objects may send SNMP traps to the SAN management server 200 when an event happens. The SAN access layer 204 may provide notification of SAN events such as the addition or deletion of SAN components such as SAN fabrics, switches and arrays. In one embodiment, the SAN management system may also monitor conditions in-band, e.g. using the Fibre Channel Common Transport (CT) protocol.

Collectors

The SAN management system may manage a SAN by monitoring SAN devices and enforcing predefined actions should any device fail to operate within the defined boundaries. In one embodiment, to enable this level of policy management, the SAN management system may include collectors. In one embodiment, these collectors may be based on devices' SNMP MIB variables. A collector may be a path or channel through which the SAN management system gathers a specific type of data for a specific object type. There may be one or more types of collectors, for example collectors for object availability, collectors for environmental conditions, collectors for device errors, and collectors for SAN traffic. Collectors may monitor properties such as switch port status, dropped frames, disk temperature, link failures and so on, which may be evaluated by the policy service 220 to create an accurate composite status of the SAN. In one embodiment, the status of devices may be displayed on a topology map of a SAN manager 202 user interface, for example using color-coded icons.

Embodiments of the SAN management system may use collector data in real-time collector graphs, the policy engine, and the SAN reporter. In one embodiment, collector values may be refreshed at regular intervals, forming one or more data streams that the SAN management system may use to monitor SAN conditions. Collectors may be used as the basis for policy conditions. In one embodiment, collector data may be stored and used to generate reports about the SAN. Collector data may be stored in a database 226 to provide a single source of accurate information for the entire SAN.

Each collector may use one of one or more methods for monitoring conditions on a SAN. These methods may include, but are not limited to, out-of-band polling (e.g. SNMP polling) and traps (e.g. SNMP traps) and the SAN access layer 204. The SAN access layer 204 may provide notification of SAN events such as the addition or deletion of SAN components such as SAN fabrics, switches and arrays. In one embodiment, one or more collectors may monitor conditions in-band, e.g. using the Fibre Channel Common Transport (CT) protocol.

In one embodiment, the SAN management system may include one collector per data type per object, for each object that can be monitored. In one embodiment, each collector may be associated with an object type, such as a SAN host 102 or a switch port. In one embodiment, each collector may be associated with a type of data, for example textual state or numeric threshold data. Textual state collectors may be associated with one or more possible values.

Traffic collectors may monitor SAN traffic at the switch port level. The SAN management system may provide a variety of collectors for different vendors including, but not limited to, Brocade, McDATA and QLogic. Various collectors may monitor SAN traffic metrics including, but not limited to, frames discarded, frames rejected, port utilization, and buffer credits.

Error collectors may be used to monitor SAN devices including switches and storage devices. For switches, monitored error information may include one or more of, but is not limited to, CRC errors, address errors, delimiter errors, invalid transmission words, link failures, link resets, sequence errors, signal loss, sync loss, encoding errors, frames too short/long, and invalid order sets. Error collectors may monitor storage devices for errors including one or more of, but not limited to, array processor errors, internal bus errors, cache errors, memory errors, warning errors, array status, and array failure. Storage devices that may be monitored may include one or more of, but are not limited to, RAID systems, disk arrays, JBODs, tape devices, and optical storage devices.

Environmental collectors may monitor environmental conditions of SAN objects. Monitored environmental conditions may include, but are not limited to, battery status, fan status, power supply status, and other detailed information for at least some objects including disk arrays and switches.

Availability collectors may provide monitoring of device availability states for fabrics 100, hosts 102, switches and other devices. Availability collectors may include, but are not limited to, device offline/online, device mode, fabric added/removed, host online/offline, and switch port online/offline collectors.

Policy Management and Notification

In one embodiment, the SAN management system may include a policy service 220 that manages policies that are associated with objects on the SAN. Objects that may be monitored include, but are not limited to, fabrics 100, switches, switch ports, hosts 102, and disk arrays. The SAN management server 200 host 102 is also an object, and one embodiment may include a set of policies that monitor the SAN management server 200.

Policies may be viewed as rules that may be used to help manage a SAN by automating responses to certain events and conditions. Policies may detect when something goes wrong, and may be used to anticipate and handle problems before they occur. A policy may include a condition to monitor, such as a high percentage of bandwidth utilization on a switch port, and a set of actions to take when that condition is met, such as raising alerts on the SAN manager 202 user interface, sending e-mail, triggering SNMP traps, and/or invoking commands and/or scripts. In one embodiment, the policy service 220 may be integrated with the SAN manager 202, permitting users to view what policies are in effect on their SAN, to define and modify policies, and to generate inventory and performance reports based on the conditions monitored by the policy service 220.

Policy rules may be expressed in ordinary language, for example: "If port utilization exceeds 90% of its total bandwidth for more than sixty seconds, send an e-mail to the system administrator." In one embodiment, if a condition specified by a policy is detected, the SAN management system may trigger an alarm, and the alarm instance may be added to a list of active alarms.

A policy may indicate a particular object or type of object to monitor. In general, any object for which the SAN management system provides at least one collector may be monitored. A policy may include a description of the condition to monitor on an object. The condition may be based on the value of a collector that represents the type of data to be monitored for the object. The condition may be either a quantitative evaluation (for example, less or more than a certain percentage of available disk space) or a textual value (such as whether a switch's status is "offline" or "online").

A policy may indicate one or more actions to be taken when the condition is detected. Actions may include raising an alert on the SAN manager 202 user interface, invoking commands and/or scripts, sending e-mail notification to a responsible party or parties (e.g. on enterprise management system 116), and/or triggering SNMP traps (e.g. to management frameworks such as Hewlett-Packard OpenView).

One embodiment of the SAN management system may include a set of predefined policies that may be used "out of the box" to achieve at least some SAN monitoring goals without having to code and configure "custom" policies. In one embodiment, a predefined policy may send an alert to the SAN manager 202 as a default action in response to a default condition of the policy. In one embodiment, if desired, an administrator may modify the intervals that the policy service gathers SAN data, the conditions that trigger alerts and notifications, and the actions in the predefined policies. For example, the administrator may desire to adjust the threshold value for a monitored condition such as port utilization, or configure an action in addition to a default alert sent to the SAN manager 202. Predefined policies may include one or more of, but are not limited to, traffic policies, error policies, availability policies, and environment policies.

In one embodiment, the policy service 220 may also provide a mechanism or mechanisms for users to create custom policies for collector types. In one embodiment, users may set the scope of a policy to apply to all objects that support a collector type. In one embodiment, users may set the scope of a policy to apply to all objects of a particular type. In one embodiment, users may set the scope of a policy to apply to a specific object.

One embodiment may include a policy engine that performs the instructions described in all policies enabled on the SAN. In one embodiment, the policy engine may be a component or process of the policy service 220. Each policy may be based on a particular type of data, represented by a collector, for a particular object or type of object. When the SAN management system discovers the objects on the SAN, it may determine which collectors correspond to the objects and register the relevant collectors with the policy engine. The policy engine then may receive stream(s) of real-time collector data and compare data values with the conditions described in its policies. When the alarm condition for a particular policy is met, the policy engine performs the actions described in the policy.

The policy engine may use current collector values from the data stream, and may retain the values in a buffer long enough to determine whether an alarm threshold has been met. For example, a threshold may be defined as "switch port utilization greater than eighty percent for two minutes." In this example, the policy engine may monitor the current value of a port utilization collector over a two-minute period. When a threshold condition is met, the policy engine performs whatever action is prescribed by that policy At least some policies may rely on vendor-supplied SNMP Management Information Bases (MIBs) to detect and monitor properties for switches, switch ports, disk arrays and other SAN devices such as switch port status, dropped frames, disk temperature, link failures, and so on. In one embodiment, the policy engine may use SNMP traps from some SAN devices, for example Brocade switches and Compaq arrays, for performance monitoring. SNMP traps from other SAN elements may simply trigger another discovery cycle.

In one embodiment, the SAN manager 202 may include a policy utility to facilitate policy creation and maintenance. The policy utility may lead a user through the steps of providing the information described above to create user-defined policies. The user may use the policy utility to make changes in existing predefined or user-defined policies as desired.

An alarm is a signal that is generated by a policy when the condition specified in the policy is detected or evaluated as true. An alarm may be triggered if the condition and alarm action are configured in the policy. Note that alarms are associated with alerts, but are not the same. An alarm is an internal signal used by the SAN management system. An alert to the SAN manager 202 is a configurable responses that may result from an alarm being triggered. When an alarm is triggered, the alarm may be referred to as active. In one embodiment, alarms in the SAN management system may be dynamic— the alarm resets itself automatically when the condition monitored by the policy returns to a specified "clear state." The clear state for a condition may specified either manually or automatically, depending on whether the condition is a threshold or a textual comparison condition.

One embodiment of the SAN management system may include an alarm service 222 that may monitor and collect status and performance information from the SAN using both out-of-band (e.g., SNMP) and SAN access layer 204 events. This collector information may then be fed into the policy service 220 to trigger policy actions such as SMTP mail, SAN manager alerts, shell scripts and command files, and logging for reporting purposes. In one embodiment, the SAN management system may log data collected by the alarm service in a database 226. One embodiment may use the Sybase ASA (Adaptive Server Anywhere) database management system for the database 226.

The conditions available for a policy may be determined by the type of object being monitored. Different types of policy conditions may result in different types of alarms. There are many possible types of conditions for various objects managed by the SAN management server 200. In one embodiment, these conditions may fall into one of two categories, threshold conditions and text comparison conditions.

One type of policy is a threshold condition with action policy. These policies may be used to monitor an object and detect when a particular numeric threshold is reached and sustained for a configurable period. The collector on which a threshold condition is based may provide data in numeric form, for example as numbered units or a percentage. This type of policy may also reset the alarm when the value being monitored returns to a normal, or below threshold value. Both the alarm state and the clear state of a threshold condition may be configured when defining the policy. A threshold condition with action policy may also provide a condition to reset the alert when the value being monitored returns to a normal, or below threshold value.

Another type of policy is a text comparison condition with action policy. This type of policy may be used to evaluate a textual state to determine the status or condition of the resource. The collector on which a text comparison condition is based provides data as one of one or more possible textual states defined for that collector. An example of a textual state is the port status of a switch as "online" or "offline." The clear state of a text comparison condition may be automatically assigned and may be, but not is necessarily, the opposite value of the specified alarm state.

For every policy, one or more actions to be taken when the specified condition is detected may be configured. Actions may, for example, perform corrective and/or notification functions. One type of policy action is a console alert, which may send an alert to the SAN manager 202 when the specified condition is detected. The desired level of severity associated with the action may be configurable. Another type of policy action is a command or script that executes a command or executable file specified for the action. Yet another type of policy action is to send e-mail notification to one or more specified recipients. In one embodiment, the policy service 220 may be configured to send traps (e.g. SNMP traps) as notifications to network management platform applications such as Hewlett-Packard OpenView Network Node Manager, Tivoli TME, and others. The policy service traps may be handled like any other traps that are received by the network management application. In one embodiment, trap notification may be configured using the policy utility.

Storage Access Control

The SAN management server and SAN access layer may discover the SAN and perform zoning functions, monitor SAN status and performance information, provide the information to the SAN manager, detect SAN events, and execute policies including performing policy actions such as notifications and alerts to the SAN manager, among other functions. The SAN manager may perform as a centralized point for viewing the SAN and generating SAN reports based upon SAN information received from the SAN management server and SAN access layer, among other functions. In addition, the SAN manager may provide a centralized point for configuring and managing the SAN and for configuring and managing heterogeneous components of the SAN. Embodiments of the SAN management system may provide one or more utilities, tools and services that, for example, may help administrators and other users maintain a quality of storage service for SAN-attached servers, and which may be available to the administrator and other user through the SAN manager user interface. In one embodiment, one or more of the utilities, tools and services may be launched in-context from the SAN manager. For example, one or more SAN objects (e.g., SAN device, device type, resource group, etc.) may be selected in the SAN manager user interface and a utility applicable to the selected SAN object(s) may be launched for the SAN object(s). These utilities, tools and services provided by the SAN management system may include one or more of, but are not limited to, resource group, zoning, and LUN security utilities, tools and services, which are described below.

Groups

In one embodiment, the SAN management system may support the creation and management of user-defined groups of SAN objects. In one embodiment of the SAN management system, the SAN manager may serve as a centralized point from which a SAN administrator or other user may create and manage groups of SAN objects, including groups of heterogeneous components. A group may be defined as an arbitrary set of SAN elements defined by an administrator to help organize and provision resources. Groups may be implemented and used by storage administrators to identify and manually provision available storage devices 104 that match the quality of service requirements of particular user groups or applications. Groups may be used to represent the storage resources available to a particular host 102, sets of storage devices 104 with similar quality of service attributes, or for generic organizational purposes.

One embodiment of the SAN management system may provide a group utility for creating and managing logical groups of SAN objects including hosts 102, storage device 104 interconnects, other groups, and other objects that may be members of a group. In one embodiment the group utility may be provided through the SAN manager. The group utility may facilitate the management of end-user resources as logical groups of SAN objects. The group utility may be used to create logical storage groups where device membership may be based on zoning, LUN masking, hosts etc., and may also be based on the need for a collection of devices to be viewed as one entity for SAN management system activities such as reporting, configuring and monitoring SAN resources.

In one embodiment, the SAN management system may support one or more types of groups, including, but not limited to, generic groups, storage accounts, and storage groups. Generic groups may include switches, hosts 102, storage devices 104, and/or nested groups of any group type. A generic group may include any type of object that can be grouped. Generic groups may be defined and used as flexibly as the administrator likes. Storage accounts may include hosts 102, storage devices 104, and/or nested groups (storage accounts or storage groups only). A storage account may include one or more host objects and all the storage that the administrator assigns to them. Storage accounts may be used to keep track of the storage resources provisioned for hosts on the SAN. Storage groups may include storage devices 104 and/or nested groups (storage groups only). Storage groups may be used to categorize storage resources by quality of service criteria including, but not limited to, cost, performance, capacity and location.

In one embodiment, groups may be nested within other groups. Nested groups may not introduce cyclic dependency. That is, if Group B is nested within Group A, Group A cannot then be nested within Group B, creating a loop. In one embodiment, the SAN management system checks for cyclic dependency and prevents users from creating such a configuration. A generic group may include any other type of group nested within it. Storage accounts may include other storage accounts or storage groups, but may not include generic groups. Storage groups may include only other storage groups, and may not include storage accounts or generic groups.

In one embodiment, there is no member exclusivity applied to generic groups. An object may have membership in multiple generic groups. In one embodiment, in certain cases, if an object is already a member of a group, it may not become a member of another group. For example, if an object is already a member of a storage account, it may not be added to another storage account. As another example, if an object is already a member of a storage group, it cannot be added to another storage group. As yet another example, an object cannot be added to a group twice, for example by adding the object individually and adding a nested group in which the object is a member. If the object is first added individually, the nested group may not be added afterward, and vice versa. In one embodiment, member exclusivity may not apply when nesting groups. By nesting one group within another, objects within the nested group become members of both groups.

One embodiment of the SAN manager may provide a groups view through which the user may view and manage groups of SAN resources. In one embodiment, groups may be represented as directories including sub-branches for each type of member object. The groups view may be used, for example, to locate a particular group by name in order to view the storage devices, hosts, switches, or sub-groups included in that group. In one embodiment, a group may be selected and a SAN management system tool or utility, or optionally a third-party tool or utility, may be launched "in-context" to perform one or more operations on the group or member objects in the group.

Group information for SAN objects may be displayed in one or more other SAN manager views and panes. In one embodiment, selecting a group in the groups view (or in one or more other views of the SAN manager) may highlight the group and/or members of the group and/or display group information in other views of the SAN manager. For example, when a group is selected in the groups view, its member objects may be highlighted in a topology map of the SAN manager. As another example, an attributes pane may display a group objects table when a group is selected.

In one embodiment, the SAN management system may be used to generate reports on groups of SAN objects. For example, capacity reports may display the storage capacity available in a user-defined group. As another example, groups inventory reports may provide information about one or more groups such as group name, description, total storage capacity, number of hosts, number of devices, number of switches, and number of nested groups. One embodiment may track LUN allocation to storage groups, and may provide one or more storage group LUN allocation reports that the user may use in tracking and managing storage group LUN allocation.

Zoning

The flexible connectivity capabilities of the SAN storage model may pose security risks. Zoning helps alleviate that risk by providing a means of controlling access between objects on the SAN. By creating and managing zones, the user may control host 102 access to storage resources. In one embodiment, the SAN manager may serve as a centralized point from which an administrator or other user may create and manage zones of SAN objects, including zones of heterogeneous components.

A zone is a set of objects within a SAN fabric that can access one another. Zones and their member objects may be defined in zoning tables within the switches on the SAN fabric 100. When zoning is implemented on a SAN fabric 100, the switches consult the zoning table to determine whether one object is permitted to communicate with another object, and restrict access between them unless they share a common membership in at least one zone.

Fabric zoning occurs at the level of individual nodes or ports attached to the SAN fabric 100. Zoning-enabled fabrics 100 may include zoning tables that define each zone along with its member objects. These zones function similar to virtual private networks (VPNs) on traditional networks.

There may be one or more ways to use zoning to improve the security and organization of the SAN. Examples of uses of zoning include, but are not limited to: isolating storage resources for different operating environments, such as separating UNIX storage from Windows NT storage; setting aside resources for routine backups; securing areas of the SAN for storage of sensitive data; and creating dedicated resources for closed user groups.

In one embodiment, the SAN management system may provide methods to enforce the access restrictions created by zones on the SAN. These methods may include two methods that correspond to the forms of zoning commonly referred to as soft zoning and hard zoning.

Soft zoning, also called advisory zoning, may be enforced simply by filtering the visibility of objects on the SAN so that an object can only see other objects that share at least one zone membership with the object. At boot time, a SAN host 102 or device requests a list of the World Wide Names (WWNs) on the SAN fabric 100 from the fabric Name Service. The Name Service may consult the zoning table and filter out of its response any WWNs that are not zoned together with the host 102 or device making the request. In this way, a host 102 on the SAN is only made aware of devices whose WWNs are zoned together with the host's HBA port.

Soft zoning is flexible because it does not rely on an object's physical location on the SAN. If its physical connection to the SAN fabric 100 changes, its zone memberships remain intact because the zone memberships are based on the WWNs of the object's ports. However, soft zoning may have security vulnerability in that it does not actively prevent access between objects that belong to different zones. Even if the Name Service does not supply a SAN host 102 with the WWN of a device that is zoned away from the host 102, a user who knows that WWN (or a hacker trying different combinations of addresses) may still send Fibre Channel packets from the host 102 to that device.

When hard zoning is implemented, a Fibre Channel switch may actively block access to zone members from any objects outside the zone. This may be performed at the level of ports on the switch. Hard zoning may also be referred to as switch port zoning. The switch checks each incoming Fibre Channel packet against its routing table to see whether the packet may be forwarded from the entry port to its destination port. Switch port zoning offers strong security because it actively segregates zone members from the rest of the SAN fabric 100. However, hard zoning may lack the flexibility of soft zoning, since an object attached to a zoned switch port loses its zone membership when it is physically disconnected from that switch port and moved elsewhere on the SAN. New objects attached to the switch port may inherit the zone memberships of that port, so planning and record keeping by the administrator may be needed to avoid breaks in security when moving objects around on the SAN.

In one embodiment, the SAN management system may support the zoning of objects on the SAN including, but not limited to, switch ports, hosts 102, and storage devices 104 including, but not limited to, storage arrays, JBODs, and individual storage devices. In one embodiment, the SAN management system may support switch zoning though application program interfaces (APIs) provided by switch vendors, allowing for both hard (port-level) and soft (advisory, WWN) zoning. Zoning may be implemented and used by storage administrators using one or more SAN management system services, tools and/or utilities for allocating storage resources and managing SAN security, and optionally one or more third-party tools, utilities or applications. In one embodiment, the SAN manager may serve as a centralized point from which a manager or other user may access SAN management system and/or third-party services, tools, applications, and/or utilities to create and manage zones on the SAN, including zones containing heterogeneous SAN objects.

In one embodiment, the SAN management system may provide a zone utility that may facilitate the creation, modification, and deletion of zones. In one embodiment, the zone utility may be provided through the SAN manager. The zone utility may provide storage zone definition, creation and management. The zone utility may be used to administer zones directly and visually; and may reduce or remove the need to use telnet commands or proprietary, hardware-specific Web-based solutions. The zone utility may facilitate the creation of new zones and edits to existing zones. The zone utility may automatically filter the list of objects on the SAN and present a list of objects that are available to be added to a zone. In one embodiment, an object may be zoned based on the World Wide Name (WWN) of the object node, the WWN of an individual port under the object node, or the switch port to which the object is attached. In one embodiment, users may administer zoning though the zone utility or optionally through a command line interface.

There may be no industry-wide standard for zoning, and thus different vendors' switches may implement switch zoning in different ways. Thus, one embodiment of the SAN management system may use a switch-neutral approach to zoning. This embodiment may not specify, for example, whether hard zoning (port-level zoning) or soft zoning (based on WWNs) should be applied in any particular case. In this embodiment, implementation details such as these may be left up to the switch vendor.

Embodiments may also provide datapath zoning control for interconnects from vendors such as Brocade, QLogic, and McDATA using the zone utility to abstract the individual interconnects' complex zoning tools to simplify creating, adding to, and deleting zones.

LUN Security

Ensuring that SAN applications have the required storage resources may include providing secure storage from storage devices 104 (e.g. disk arrays, tape backup devices, etc.) to hosts 102 within the SAN. In one embodiment, the SAN management system may integrate storage masking from various array providers, for example Hitachi Data Systems, Compaq and EMC, to hosts 102 in the SAN. LUN (Logical Unit Number) security is the collective name given to the operations involved in making storage device 104 resources available to hosts 102 on a SAN. In one embodiment of the SAN management system, LUN security may provide granular control over host 102 access to individual LUNs within an array or other collection of potentially heterogeneous storage devices. LUN security may include LUN locating or searching, LUN binding, LUN masking, and fabric zoning. In one embodiment, the SAN manager may serve as a centralized point from which the administrator or other user may manage LUN security for heterogeneous SAN components.

A LUN is the SCSI (Small Computer System Interface) identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk may have a single logical unit, or alternatively may have more than one logical unit. Tape drives and array controllers may incorporate multiple logical units to which I/O commands can be addressed. Each logical unit exported by an array controller corresponds to a virtual disk.

Figure 12:
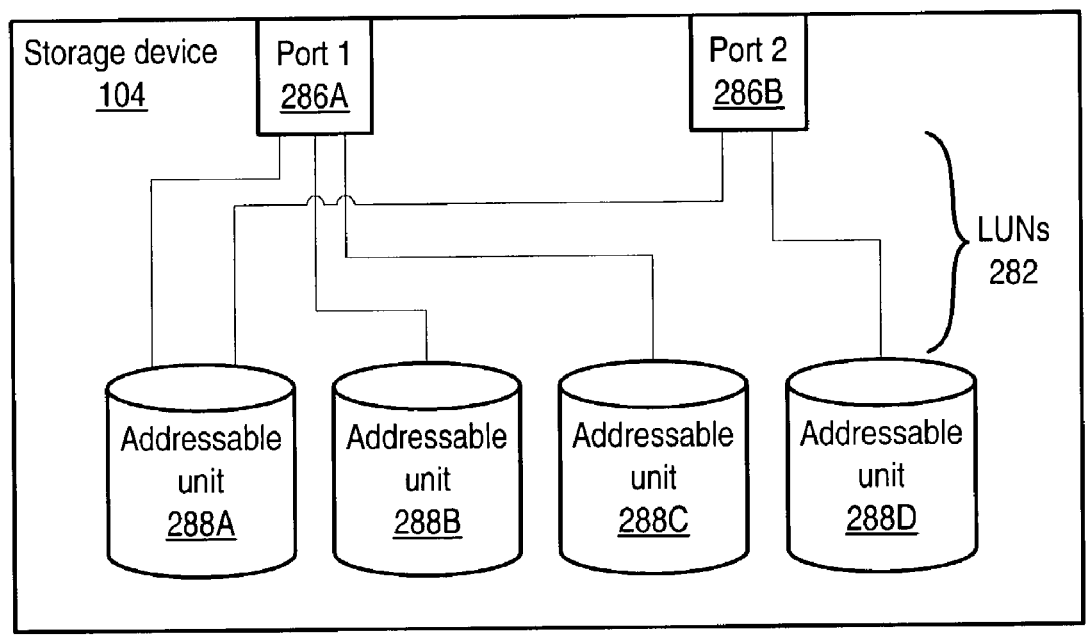
FIG. 12 illustrates LUN binding according to one embodiment.

LUN security may include LUN binding, the creation of access paths between an addressable unit (which may also be referred to as an AddrUnit, an AU, a unit, a volume, a logical unit, a logical disk, or a logical device) within a disk array and a port on the array. FIG. 12 illustrates LUN binding according to one embodiment. In the LUN binding process, an AU 288 is bound to a specified array port 286 (e.g. array port 286A or 286B) in a specified storage device 104 (e.g. a storage system/disk array)). This results in the creation of a LUN 282. AUs 288A, 288B, 288C, and 288D are storage volumes built out of one or more physical discs within the storage device 104. Array ports 286A and 286B are connected to the SAN fabric 100 and function as SCSI targets behind which the AUs 288 bound to those ports 286 are visible. "LUN" is the term for the access path itself between an AU 288 and an array port 286, so LUN binding is actually the process of creating LUNs 282. However, a LUN 282 is also frequently identified with the AU 288 behind it and treated as though it had the properties of that AU 288. For the sake of convenience, a LUN 282 may be thought of as being the equivalent of the AU 288 it represents. Note, however, that two different LUNs 282 may represent two different paths to a single volume. A LUN 282 may be bound to one or more array ports 286. A LUN 282 may be bound to multiple array ports 286, for example, for failover, switching from one array port 286 to another array port 286 if a problem occurs.

Figure 13:
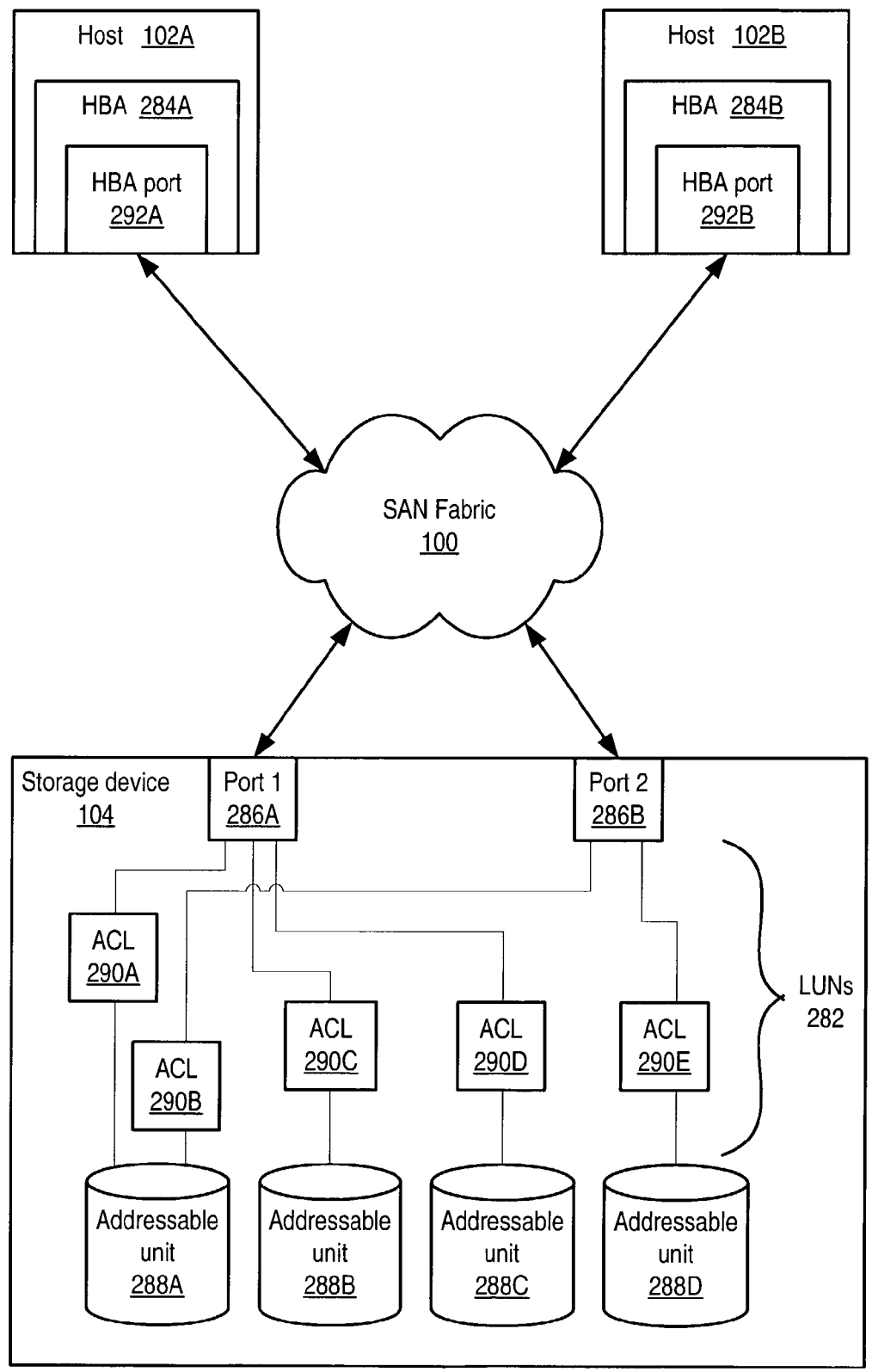
FIG. 13 illustrates LUN masking according to one embodiment.

LUN security may also include LUN masking to enable access to a particular Addressable Unit for a host on the SAN. FIG. 13 illustrates LUN masking according to one embodiment. LUN masking is a security operation that indicates that a particular host 102 (e.g. host 102A or 102B), HBA (Host Bus Adapter) 284 (e.g. HBA 284A or 284B), or HBA port 292 (e.g. HBA port 292A or 292B) is able to communicate with a particular LUN 282. In the LUN masking process, a bound AU 288 (e.g. AU 288A, 288B, 288C or 288D) may be masked to a specified HBA port 292, HBA 284, or host 102 (e.g. all HBAs on the host) through a specified array port 286 in a specified storage device 104. When an array LUN 282 is masked, an entry is added to the Access Control List (ACL) 290 (e.g. ACL 290A, 290B, 290C, 290D, or 290E) for that LUN 282. Each ACL 290 includes the World Wide Name of each HBA port 292 that has permission to use that access path—that is, to access that AU 288 through the particular array port 286 represented by the LUN 282.

LUN masking may be thought of as the removal of a mask between an AU 288 and a host 102 to allow the host to communicate with the LUN 282. The default behavior of the storage device 104 may be to prohibit all access to LUNs 282 unless a host 102 has explicit permission to view the LUNs 282. The default behavior may depend on the array model and, in some cases, the software used to create the AU 288.

Figure 14:
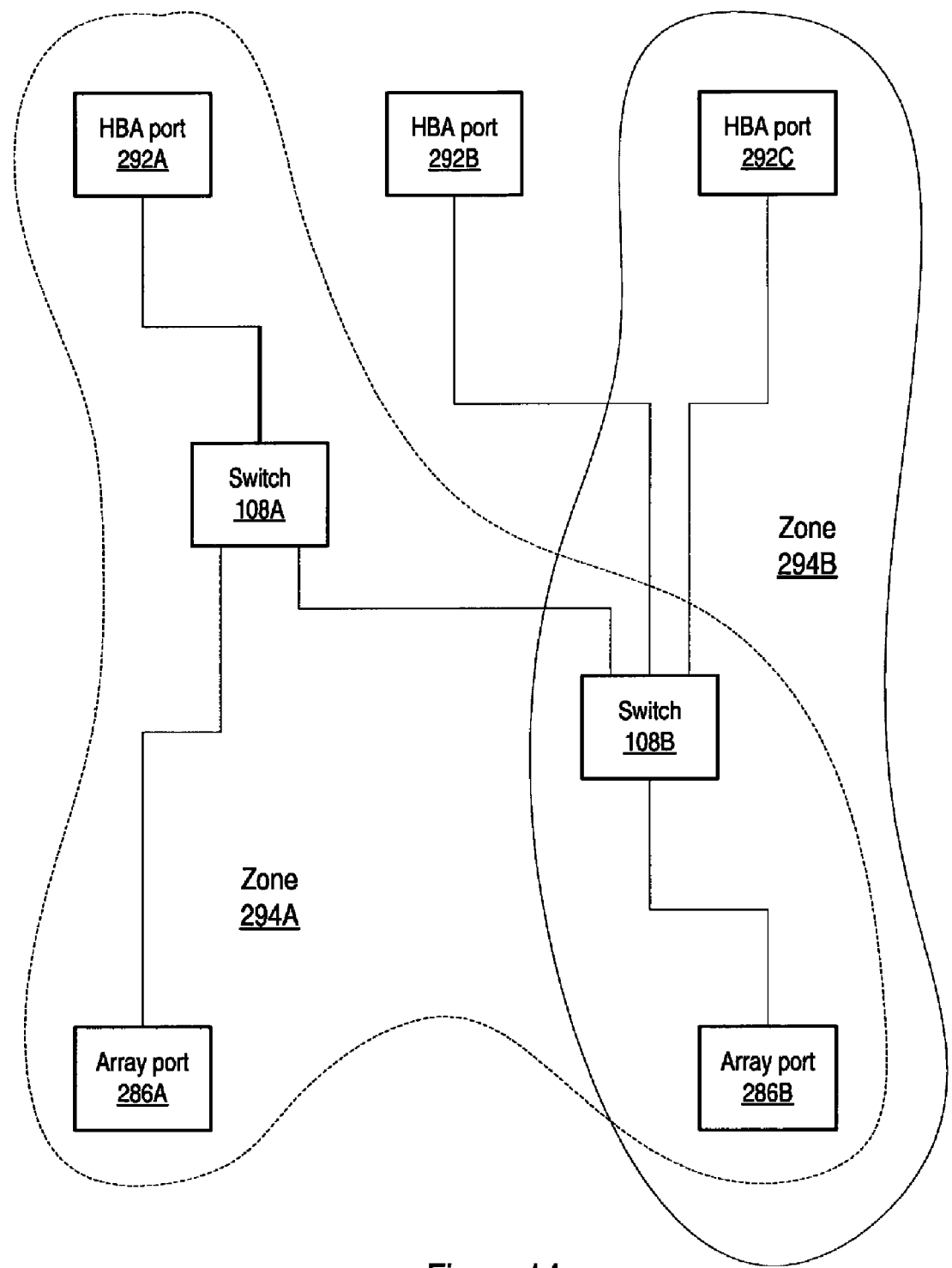
FIG. 14 illustrates fabric zoning according to one embodiment.

LUN security may also include fabric zoning. FIG. 14 illustrates fabric zoning according to one embodiment. After a LUN is masked to an HBA port 292 (e.g. HBA port 292A, 292B or 292C) in a host, the zoning configuration of the SAN fabric 100 may still prevent the host from accessing the AU behind that LUN. In order for the host to see the AU and create an Operating System (OS) handle for it, there must be at least one zone on the fabric 100 that contains both the HBA port 292 (e.g. HBA port 292A, 292B or 292C) and the array port 286 (e.g. array port 286A or 286B) to which the AU is bound. A zoning operation may be required if the HBA port 292 and array port 286 are not already zoned together. Zoning operations may include creating a new zone 294 and adding the array port 286 and the HBA port 292 to an existing zone 294. Zones 294 may also include one or more ports on one or more fabric devices (e.g. switches 108A and 108B) in the device path between the array port 286 and the HBA port 292. Fabric zoning occurs at the level of individual nodes or ports attached to the SAN fabric. Zones and their member objects may be defined in zoning tables within the switches 108 on the SAN fabric. When zoning is implemented on a SAN fabric, the switches 108 consult the zoning table to determine whether one object is permitted to communicate with another object, and restrict access between them unless they share a common membership in at least one zone.

In FIG. 14, zone 294A includes HBA port 292A, the array ports 286A and 286B through which HBA port 292A may access LUNs bound to the array ports 286, and the switch ports on switches 108A and 108B through which HBA port 292A and array ports 286 are coupled. Zone 294B includes HBA port 292C, array port 286B through which HBA port 292C may access LUNs bound to the array port 286B, and the switch port(s) on switch 108B through which HBA port 292C and array port 286B are coupled. HBA ports 292A, 292B and 292C may be on the same host or on different hosts and, if on the same host, on the same HBA or on different HBAs. Array ports 286A and 286B may be on the same storage system or on different storage systems. For more information on zoning, see the description of zoning above.

Figure 15:
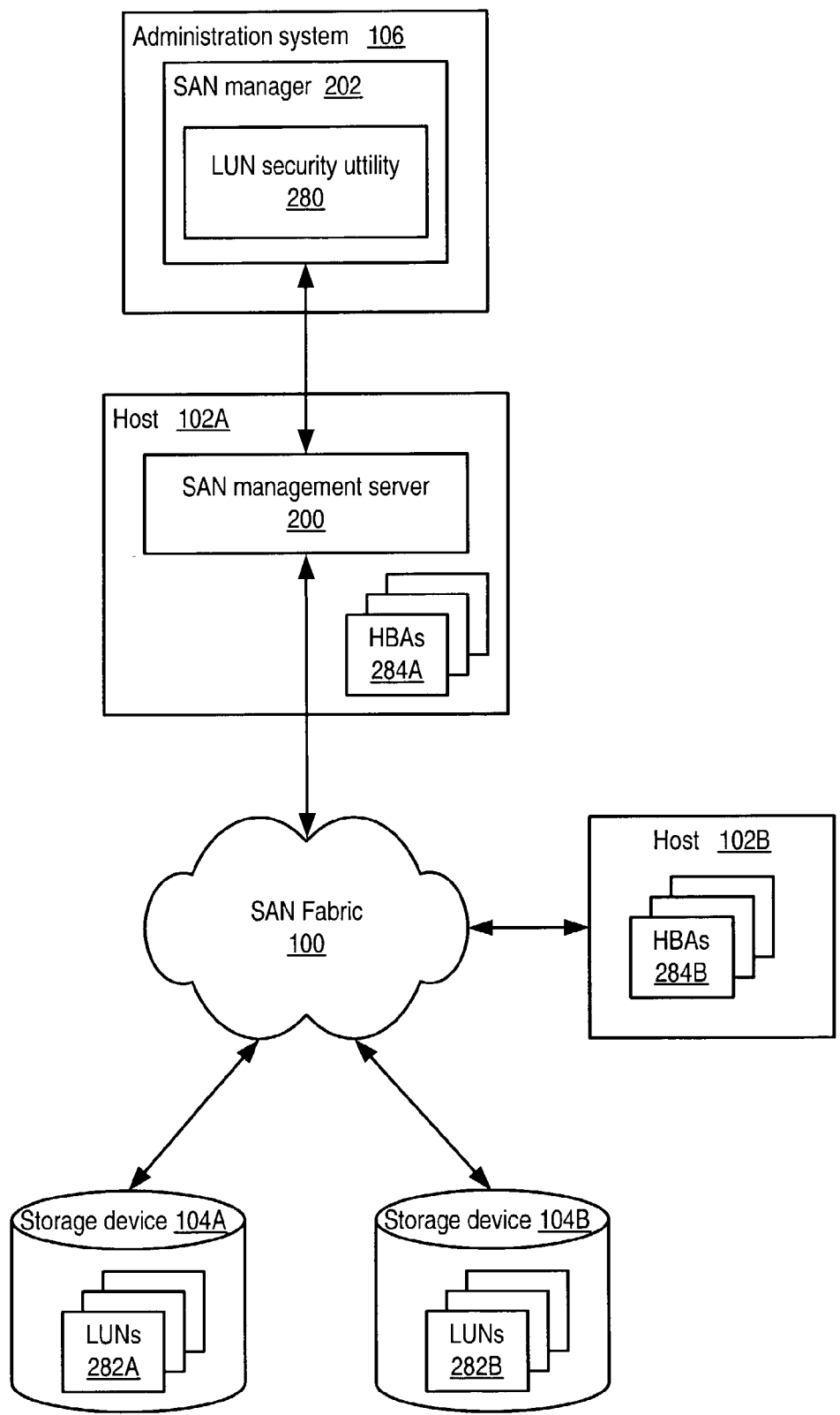
FIG. 15 illustrates a SAN with a LUN security utility according to one embodiment.

In one embodiment as illustrated in FIG. 15, the SAN management server 200 may discover SAN components including, but not limited to, one or more storage devices 104 (e.g. storage devices 104A and 104B) each including one or more addressable storage units and one or more fabric ports for coupling to the SAN, and one or more host systems 102 each including one or more host bus adapters (HBAs) 284 which each provide host adapter ports for coupling to the SAN. The SAN manager 202 client may access the SAN management server to provide a user interface for selecting addressable storage units to be made available to selected host adapter ports and to communicate with the SAN management server to create access paths between selected addressable storage units and selected fabric ports of the storage systems, enable access to the selected addressable storage units for the selected host adapter ports, and zone the selected storage system fabric ports in a common fabric 100 zone with the selected host adapter ports.

In one embodiment, the SAN management system may provide a LUN security utility 280, which may combine LUN security operations including, but not limited to, searching for and locating one or more LUNs 282, LUN selection, LUN to disk array port binding, LUN masking and fabric zoning operations in one utility. In one embodiment, the LUN security utility 280 may be provided to the user through the SAN manager 202 user interface. In one embodiment, the SAN manager may run on an administration system 106. In one embodiment, the LUN security utility 280 may provide a central utility that, through a graphical user interface, guides the user through configuring LUN security operations (finding and selecting one or more LUNs, binding, masking and zoning) and allows the user to execute the configured LUN security operations with a single operation, for example, a single click of a button in the user interface. Thus, the LUN security operations (finding and selecting one or more LUNs, binding, masking and zoning) may be performed as a single operation from the perspective of the user.

In one embodiment, if any portion of the LUN security operation (binding, masking, and/or zoning) configured and initiated by the user from the LUN security utility fails to successfully complete, the LUN security utility may "back out" of the entire configured LUN security operation, and may undo any portions of the LUN security operation already completed and/or leave undone any portions not yet performed. By so doing, the LUN security operation may leave the various SAN components being operated on by the LUN security operation in their original state before the start of the operation if any portion of the operation fails. Thus, LUN security operations configured and initiated using the LUN security utility may be viewed as transactions. A transaction may be defined as a sequence of information exchange and related work that is treated as a unit for the purposes of satisfying a request and for ensuring data integrity. For a transaction to be completed and changes to be made permanent, a transaction has to be completed in its entirety.

The SAN management system may provide a single point of management from logical units of storage devices 104 to interconnect to SAN-connected hosts 102. The LUN security utility 280 may provide a central point from which to perform LUN security operations including LUN binding (the creation of access paths (LUNs) between Addressable Units within a disk array and ports on the array), LUN masking (enabling access to Addressable Units for host HBA ports) and fabric zoning (allowing the host to see the AU and create an Operating System (OS) handle for it).

The LUN security utility 280 may guide users through searching and locating, selecting, binding, masking and zoning operations. The LUN security utility 280 may be used to bind LUNs 282 to ports on the array and further mask the LUN(s) to target host HBA 284 ports. The LUN security utility 280 may include safety controls to ensure that invalid LUN binding and LUN masking configurations are not created. The LUN security utility 280 may support multiple storage array vendors, and thus may serve as a centralized utility for performing LUN security operations for heterogeneous SAN components.

Using the LUN security utility 280, users may specify LUNs 282 and disk array ports to bind. In one embodiment, the SAN management system may provide a LUN query tool for finding and selecting LUNs 282. Users may also use the LUN security utility 280 to select hosts' HBA 284 ports and LUNs 282 for LUN masking/security. The LUN security utility 280 may allow users to select a zone that contains the array port and a host's HBA port(s). If no such zone exists, the LUN security utility 280 may allow users to create a new zone or add the array port and the host's HBA 284 port(s) to an existing zone.

In one embodiment, the SAN access layer may be a component or "layer" of the SAN management server 200. Functions of the SAN access layer may include discovery and zoning. In one embodiment, the SAN access layer may include one or more explorers (e.g. disk array explorers) that may discover storage devices 104 (e.g. disk arrays and enclosures) and information about the storage devices 104 such as the storage devices' ports, addressable units and LUNs 282. In one embodiment, the SAN access layer may discover LUNs 282 that are not masked to HBA 284 ports on discovered hosts 102 on the SAN. In one embodiment, the SAN access layer may also include one or more explorers (e.g. HBA explorers) that may interact with SAN hosts 102 to discover information about the hosts 102 such as the hosts' HBAs 284, HBA ports and device paths. In one embodiment, the SAN access layer may also include one or more explorers (e.g. zoning explorers) that may discover zone names and attributes Information about discovered SAN objects such as zones, hosts 102, HBAs 284, HBA ports, storage devices 104, array ports, addressable units and LUNs 282 may be provided to the SAN manager 202 and the SAN management server 200 by the SAN access layer. The SAN management server 200 may use the provided information, for example, to configure collectors to collect information on the discovered SAN objects. The SAN manager 202 may use the provided information, as well as collected SAN data from the SAN management server 200, in one or more displays of SAN information.

In one embodiment, a user may launch the LUN security utility 280 from the SAN manager 202. The discovered SAN objects (e.g., zones, hosts 102, HBAs 284, HBA ports, storage devices 104, array ports, addressable units and LUNs 282) provided to the SAN manager 202 by the SAN access layer and/or SAN management server 200 may be provided to the user in the LUN security utility 280, and the user may locate and select from the objects when configuring LUN security operations using the LUN security utility 280 as described herein. As examples, array ports and addressable units may be selected for binding to create LUNs 282, LUNs 282 may be located and selected, and hosts 102, HBAs 284 and/or HBA ports may be selected to mask to the LUNs 282; and zones may be created and/or selected to which the HBA 284 ports and LUNs 282 are to be added. After selecting the SAN objects to be operated upon using the LUN security utility 280, the LUN security operations (e.g. binding, masking and zoning) may be performed as a single operation from the perspective of the user through the LUN security utility 280.

The LUN security operations as specified by the user in the LUN security utility 280 may be performed to establish device paths in the SAN. In one embodiment, the SAN access layer may perform the LUN security operations (e.g. binding, masking and zoning) as specified by the user in the LUN security utility 280. In one embodiment, the SAN access layer may pass LUN security commands generated by the LUN security utility to the disk arrays' 102 management interfaces for execution using the disk array explorers. In one embodiment, the SAN access layer may pass LUN security commands generated by the LUN security utility 280 to the hosts 102 for execution using the HBA explorers. In one embodiment, the SAN access layers may pass LUN security commands generated by the LUN security utility 280 to the fabric devices for execution using the zoning explorers.

In one embodiment, the SAN manager may allow the user to remove the binding between a LUN and a port of an array in the SAN. In one embodiment, if a LUN is already bound to an array port, the user may mask a host port to the LUN by launching the LUN security utility in-context from a security pane of the SAN manager. This allows the user to skip the LUN selection and binding portions of the LUN security utility. In one embodiment, the SAN manager may allow the user to remove LUN masking between a host port and an array LUN.

In one embodiment, for arrays that support user-configurable LUN binding, the SAN management system may provide an "Add LUN Binding" utility to bind LUNs without using the LUN security utility. In one embodiment, there may be a graphical user interface (e.g. a dialog box or window) to the "Add LUN Binding" utility in the SAN manager through which the user can bind LUNs.

In one embodiment, the SAN management system may provide a LUN masking utility that enables an administrator to mask LUNs to host ports without using LUN security utility. In one embodiment, there may be a graphical user interface (e.g. a dialog box or window) to the LUN masking utility in the SAN manager through which the user can mask LUNs. In one embodiment, the LUN masking utility may not provide the LUN security utility's safety features. For example, when the LUN masking utility is used to mask LUNs, the SAN management system may not check for valid LUN binding, wire connectivity, or fabric zoning between the host port and the array port.

LUN Query Tool

In one embodiment, the SAN management system may provide a LUN query tool, accessible, for example, from the SAN manager, that may be used to search for and find LUNs on the SAN that match one or more properties, such as device vendor, storage type, capacity, configuration, cost, and location. The LUN query tool may allow the user to further refine the search for LUNs based on the storage group(s) the LUNs are assigned to and/or on their accessibility from specified SAN-attached hosts 102. The LUN query tool may return a list of all LUNs that meets those requirements. The LUN query tool may be used, for example, when performing LUN security operations (e.g. binding, masking and zoning) and when allocating storage to the requester.

In one embodiment, the LUN query tool may be launched in context from another utility such as the zone utility or the LUN security utility. In this case, when the LUN query tool is closed, any selected LUNs in the LUN query tool results window may be selected (e.g. highlighted) in the UI of the utility from which the LUN query tool was launched.

In one embodiment, after using the LUN Query Tool to generate a list of LUNs that match search criteria, the user may create or edit a LUN attribute and apply the new attribute value across multiple LUNs in-context from the LUN query tool.

SAN Visualization

Figure 16:
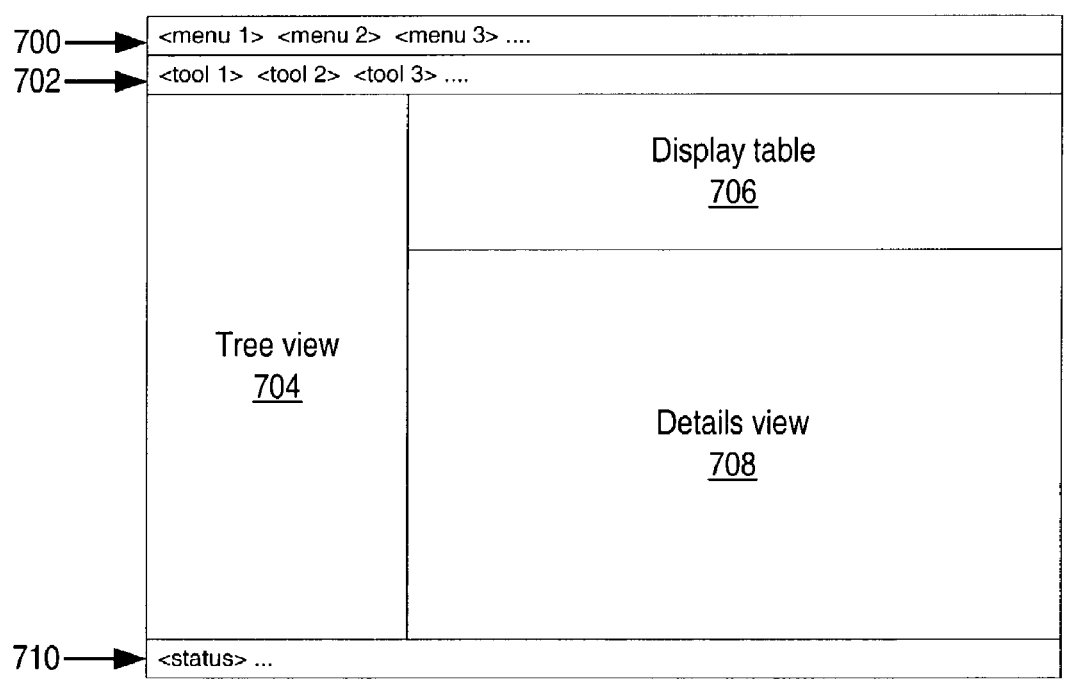
FIG. 16 illustrates an exemplary user interface of the SAN manager according to one embodiment.

In one embodiment of the SAN management system, the SAN manager may serve as a centralized point from which a SAN administrator or other user may view information about a SAN, including, but not limited to, information about the SAN's topology and heterogeneous components. In one embodiment, the SAN manager may provide a graphical user interface (GUI) that displays information from the SAN access layer and other SAN management server components. The SAN manager may provide this information in an intuitive, navigable form, and may provide a central point to view the SAN, create and modify policies, administer zoning, and launch third-party SAN management tools. FIG. 16 illustrates an exemplary user interface of the SAN manager according to one embodiment. The SAN manager's user interface may include one or more of, but is not limited to, a menu bar 700, a toolbar 702, one or more panes (704, 706, 708), and a status bar 710.

Embodiments of the SAN manager may provide one or more display panes to display SAN information in complementary formats. Display panes may include, but are not limited to, a tree view 704, a display table 706, and a details view 708. The tree view 704 may include a directory tree of SAN objects. In one embodiment, an object selected in the tree view 704 may become active throughout the other areas of the SAN manager and may be highlighted in a topology map in details view 708. In one embodiment, object selection in the SAN manager may be unidirectional, moving from the tree view 704 to the other areas, so an object selected elsewhere in the SAN manager may not normally become active in the tree view 704. In one embodiment, the display table 706 functions as an extension of the tree view 704, and objects highlighted in the display table 706 may become active throughout the SAN manager.

Various tools and utilities provided by the SAN manager may be context-sensitive in the SAN manager GUI. For example, the user may locate and select an object in the tree view 704 and then open a tool or utility to manage the selected object. The selected object may be automatically displayed in the opened tool or utility as the object for which operations of the tool or utility are to be performed.

In one embodiment, the tree view 704 may provide one or more views of the SAN, including, but not limited to, a fabrics view, a storage view, a hosts view, and a groups view. In one embodiment, each view may be accessed by selecting an associated tab at the bottom of the tree view 704, or optionally may be selected from a View menu. One of ordinary skill in the art will recognize that there are other methods for selecting the views through a user interface that may be implemented.

The fabrics view may give hierarchical priority to zones above individual devices and hosts. The fabrics view may display objects on the SAN according to the objects' membership in fabrics and zones. Each fabric on the SAN may have its own root directory in the tree. Unconnected device objects and host objects do not reside on any SAN fabric, and may appear in their own directories, for example at the bottom of the tree. The fabrics view may be used, for example, when administering zoning on the SAN. The fabrics view may allow the user to quickly locate a zone, view its member objects, and launch zone management utilities, if needed or desired.

Below each fabric in the fabrics view, the objects in the fabric may be categorized, for example as switches, unidentified adapters, unzoned objects, zone aliases, and zones. Unlike other object types, switches may not be classified as either zoned or unzoned, because the switches themselves control zoning on the SAN fabric. For that reason, switches may occupy their own branch of the directory tree under each fabric. In one embodiment, the tree view 704 may display zone aliases for types of fabrics that support zone aliases. Beneath the zone aliases branch, the tree view 704 may display hosts, storage, switch ports and unidentified adapters sub-branches. Objects that are members of at least one zone may appear in the zones category of a fabric. In one embodiment, zones on the fabric may be listed alphabetically. Beneath each zone, the zone's object members may be displayed by type, e.g. devices, hosts and switch ports.

The storage view may be used to view a list of SAN storage devices. The storage view may provide more granular information about SAN objects than the hierarchical fabrics view. The storage view may help the user to view storage device properties or zone memberships, and may be used in managing zone memberships. The list of unzoned storage devices may, for example, help the user to discover devices that may be added to a zone via the zone utility. In one embodiment, the storage view may include, but is not limited to, a list of devices on the SAN, a list of unconnected devices on the SAN, a list of unzoned storage devices on the SAN, and a list of zoned storage devices on the SAN. In one embodiment, the storage view may list all such devices that are known to the SAN management system.

The hosts view may be used, for example, to locate a particular host by name in order to view its properties or its zone memberships. The hosts view may provide more granular information about SAN objects than the hierarchical fabrics view. The hosts view may be used in managing zone memberships. The list of unzoned hosts may, for example, help the user to discover hosts that may be added to a zone via the zone utility. In one embodiment, the hosts view may include, but is not limited to, a list of hosts on the SAN, a list of unconnected hosts on the SAN, a list of unzoned hosts on the SAN, and a list of zoned hosts on the SAN. In one embodiment, the storage view may list all such devices that are known to the SAN management system.

In one embodiment, groups may be represented in a groups view as directories including sub-branches for each type of member object. When a group is selected, all its member objects may be highlighted in a topology map in the details view 708.

One embodiment may include a display table 706 that complements the object information selected in the tree view 704 by displaying the contents beneath a selected branch. The display table 706 may display information about the next layer of objects under the branch highlighted in the tree view 704. If the active branch has no leaf objects, the display table 706 may be empty. If the highlighted branch has no sub-branches, the display table 706 may display port information about the highlighted object. The types of details that appear in the display table 706 may depend on the type of object or meta-object (e.g. zones, object groups, etc.) selected in the tree view 704. For example, if "fabrics" is selected in the fabrics view, the names of all fabrics in the SAN may be displayed in the display table 706.

One embodiment may include a details view 708. In one embodiment, the details view 708 may provide one or more panes, each of which provides a different form of information about the SAN. The type and number of panes available in the details view 708 may change depending on what type of object or group is selected in the tree view 704. These panes may include, but are not limited to, a topology pane, an attributes pane, a policies pane, an alerts pane, a connectivity pane, an OS handles pane, an HBAs pane, a security pane, a collectors pane, an events pane, and various other panes of detailed object information. In one embodiment, at least a topology pane, an attributes pane, a policies pane, and an alerts pane may be displayed for each type of object or group.

The topology pane may provide a graphical representation of the SAN in the form of a topology map. The topology map may provide a visual representation of the objects on the SAN as well as a visual representation of the connections between objects. The topology map may reveal the switch port to which each object is connected. In one embodiment, connections displayed in an error color (e.g. red) indicate that a problem exists. In one embodiment, the user may select a connection or object in the topology map (e.g. by hovering the mouse cursor over the connection or object) to view detailed information about the connection or object. When a connection is selected, a "tool tip" may display the port at each end of the connection. For example, when a host is selected, information about the host may be displayed, and when a SAN storage device is selected, its properties may be shown.

In one embodiment, there may be one or more user-selectable topology map layouts, including, but not limited to, a hierarchical layout, a circular layout, a network layout, and a fan layout. The topology layout may be a matter of visual preference; however, there may be underlying design assumptions in each layout that may influence when and why one layout is chosen instead of another.

In one embodiment, the hierarchical layout is the default layout. The hierarchical layout stratifies the topology map according to object type, with hosts at the top layer, switches below them, and devices of all kinds below the switches. The circular layout arranges the SAN objects in circular patterns that represent one or more objects connected to various ports on the switch. The circles of objects may not represent arbitrated loops on the SAN, however, and thus may not be used to get a list of objects that reside in an arbitrated loop. The network layout emphasizes the switches on the SAN by displaying them centrally among the various other objects to which they connect. The fan layout positions the switches at the top of the topology map and fans out all devices and hosts at a level below the switches in a symmetrical fashion.

The SAN management system may provide one or more methods to view object attributes. One method is an attributes pane in the details view 708. The attributes pane may display detailed information about the object or directory currently selected in the tree view 704. Different object types may be associated with different sets of attributes. The attributes pane may be available regardless of what object is selected in the tree view 704, but its contents may depend on the type of object selected. The attributes pane may display a table or tables that list the attributes and attribute values associated with the type of object selected (in this example, a switch).

Although the connections between objects on the SAN may be displayed graphically in the topology pane of the details view 708, in one embodiment, a connectivity pane may present the information in a form that may be easier to read at a glance. The connectivity pane may display information about objects that are highlighted in the tree view 704. The connectivity pane may be displayed when objects of various types are selected in the tree view 704, including, but not limited to, switches, switch ports, enclosures, storage devices, LUNs, hosts, HBAs, and unidentified adapters. In one embodiment, the connectivity pane may include one or more tables that may list attributes and attribute values of some or all objects in the connectivity pane.

In one embodiment, a details view 708 OS (Operating System) handles pane may be displayed when a host, an HBA, a storage device that contains one or more LUNs, or an individual LUN is selected in the tree view 704 (or alternatively in other views or panes of the SAN manager). The OS handles pane may display the relationships between HBA ports and the LUNs that are accessible to the HBA ports (i.e., the LUNs that are masked to those HBA ports). If a host or HBA object is selected in the SAN manager, the OS handles pane may display the WWN of the HBA port, and other information about a device port and LUN associated with that HBA port. If a device or LUN is selected, the OS handles pane may display a device port, path, and LUN, the associated host and HBA port, and other information. A different set of information may display in the OS handles pane depending on the type of object currently selected in the SAN manager.

In one embodiment, the details view 708 may include an HBAs pane. In one embodiment, the details view 708 HBAs pane is displayed when a host object is selected in the tree view 704. The HBAs pane may display information about each HBA discovered in the host. The HBAs pane may include a field that displays the discovered attributes of the HBA. The HBAs pane may also include a field that displays information about each port on the HBA. If a host has multiple HBAs, the HBA to view may be selected in the selected HBA field in the pane. The number of attributes of an HBA that are displayed may depend on which SAN management system explorer(s) has discovered the HBA. If the selected host is running the SAN access layer remote, then the host's HBAs may be discovered by the HBA Explorer, which may provide more information about the HBAs. If the host is not running the SAN access layer remote, then the host's HBAs may be discovered by the management explorer through its connection to the switch, and less information about the HBAs may be available.

In one embodiment, the details view 708 may include a security pane that may include one or more tables. In one embodiment, the security pane may include an array port binding table may display information including, but not limited to, the array LUN, the array port to which the LUN is bound, and the SCSI LUN ID. A single LUN may have multiple entries in this table if it is bound to more than one array port. Each entry in the table may represent a bound LUN-array port pair. In one embodiment, the details view 708 security pane may be displayed when certain enclosure objects are selected in the tree view 704. In one embodiment, the selected enclosure may be a storage array whose LUN security features the SAN management system supports. The security pane may display LUN security and LUN binding information about LUNs in the enclosure, including, but not limited to, the array LUN, the SCSI LUN ID, the array port to which the LUN is bound, the host(s) that are masked to the LUN, the World Wide Names of the HBAs that are masked to the LUN, and the World Wide Names of the HBA ports that are masked to the LUN. If an array is selected in the tree view 704, the array's LUNs that are bound to array ports may be displayed in the security pane.

In one embodiment, the security pane may include a LUN masking table that may be context-sensitive to selections in the array port binding table. The LUN masking table may display information about LUN-array port pairs selected in the array port binding table. In one embodiment, only LUNs that are bound to an array port appear in the security pane. If the free LUNs branch under the enclosure object is selected, then the security pane may display only LUNs that are bound to an array port and that have not yet been masked to any HBA.

In one embodiment, the details view 708 may include a policies pane. In one embodiment, the policies pane may display policies available in the SAN management system, including predetermined policies and user-created policies. The policies pane may display information about each policy, including, but not limited to, the name of the policy, the set of objects to which the policy applies, and the policy's status as enabled or disabled. In one embodiment, additional information about a policy may be displayed.

In one embodiment, the details view 708 may include a collectors pane that may display the collectors that apply to the object currently selected, for example, in the tree view 704. The collectors pane may display information about each collector including, but not limited to, the name of the collector, the current value of the collector, the units of measurement that the collector value represents, and whether the collector has collected any data about the object.

In one embodiment, the details view 708 may include an alerts pane that may display alerts sent to the SAN manager in response to events on the SAN. Each alert in the alerts pane may represent a SAN event that has met either the trigger condition or the reset condition of an active policy. The alerts pane may display information about each alert including, but not limited to, the priority level of the alert, the date and time the alert was sent to the SAN manager, the description of the alert, which may include information about the trigger event, and the object at which the event occurred.

In one embodiment, the details view 708 may include an events pane that may display notifications of fabric events detected by the SAN access layer. These events may not be identical to the conditions monitored by the policy service, although the two may overlap to some extent. At least some events that appear in the events pane may be generated by changes in the discovery state of objects on the fabric, for example, when the SAN management server explorers no longer detect a previously discovered object. The events pane may be used, for example, as a debugging or troubleshooting tool. The events pane may display information about each event including, but not limited to, the object(s) on the fabric to which the event applies, the type of event, the time the event occurred, and the message associated with the event.

Data Logging and Reporting

In one embodiment, the SAN management system may include a SAN reporter that enables the user to see reports on the details of the SAN. Embodiments of the SAN management system may provide both real-time and historical performance data for critical service-level parameters such as connectivity, available space and throughput. In one embodiment, the SAN management server may collect SAN data (gathered by the collectors) that may be provided as real-time and/or historical performance data to the SAN reporter for use in generating real-time and/or historical SAN performance reports. In one embodiment, the SAN access layer may discover SAN objects and information about the discovered objects that may be provided to the SAN reporter and used, for example, in SAN inventory and performance reports. Reports may be generated on various types of SAN objects, including, but not limited to, fabrics, devices, hosts, switches, HBAs and groups.

In one embodiment of the SAN management system, the SAN manager may serve as a centralized point from which a SAN administrator or other user may generate reports on details of a SAN, including, but not limited to, information about the SAN's topology and heterogeneous components. In one embodiment, the SAN reporter may be launched from the SAN manager. At least some information used to generate reports may be gathered by the same collectors that the policy service uses to monitor conditions on the SAN. In particular, performance reports may be based on historical collector data. In one embodiment, collectors may be configured with numeric threshold data types to periodically log their values (e.g. on an hourly or daily basis), and the SAN reporter then may use these logs to generate graphical reports that display the collector values over a specified timeframe.

In one embodiment, the SAN reporter may not read the real-time data stream of collector values for some or all of the reports. Instead, the SAN reporter may use historical collector values logged to a database by the SAN management system. The values in the database may include, but are not limited to, the minimum, maximum and average values of each collector over the logging period set for the collector. The SAN reporter may use this data to generate historical reports on SAN performance over a specified period.

In one embodiment, reports may fall into one of one or more categories including, but not limited to, capacity reports, inventory reports, performance reports and alert reports. Capacity reports may display the storage capacity of the SAN as a whole and/or by subdivisions. Inventory reports may display physical objects and/or user-created objects such as groups and zones on the SAN. Performance reports may be based on the same collector information that is monitored by the policy engine. Performance reports may display the value of various collectors over a specified period (e.g. in graphical form). In one embodiment, performance reports may include traffic reports, error reports, summary reports and detail reports. Alert reports may provide information on historical alerts for a period covered by the report and summaries of the most active types of alerts during that period.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
 a storage area network (SAN) management server configured to discover and manage SANs; and a memory comprising a data representation of a SAN comprising a plurality of virtual SAN objects, wherein each of the plurality of virtual SAN objects is configured to simulate presence of a SAN device without underlying hardware to implement functionality for the SAN device actually existing in the SAN;

wherein the SAN management server is configured to access the data representation of the SAN to perform one or more SAN management tasks on the virtual SAN objects.

2. The system as recited in claim 1, further comprising:
a data store comprising a configuration file, wherein the configuration file comprises information for generating the data representation of the SAN comprising the plurality of virtual SAN objects;
a SAN simulator configured to:
    access the configuration file from the data store; and
    generate in the memory the data representation of the SAN in accordance with the information for generating the data representation of the SAN comprising the plurality of virtual SAN objects.

3. The system as recited in claim 1, further comprising a SAN simulator configured to:
generate the plurality of virtual SAN objects, wherein the plurality of virtual SAN objects comprises one or more virtual SAN objects of one or more SAN object types;
for each SAN object type:
    determine if the SAN object type is compatible with the SAN management system;
    if the SAN object type is compatible with the SAN management system, include the generated one or more virtual SAN objects of the SAN object type in the data representation of the SAN; and
    if the SAN object type is not compatible with the SAN management system, not include the generated one or more virtual SAN objects of the SAN object type in the data representation of the SAN.

4. The system as recited in claim 1, further comprising an explorer configured to access the data representation of the SAN in the memory, wherein, to access the data representation of the SAN in the memory to perform one or more SAN management tasks on the virtual SAN objects, the SAN management server is further configured to access the data representation of the SAN through the explorer, wherein the explorer is an executable component.

5. The system as recited in claim 1, further comprising a zone management application programming interface (API), wherein the SAN management server is further configured to access the zone management API to perform zone management tasks on the data representation of the SAN.

6. The system as recited in claim 1, further comprising a logical unit number (LUN) management application programming interface (API), wherein the SAN management server is further configured to access the LUN management API to perform port binding and LUN security tasks on the data representation of the SAN.

7. The system as recited in claim 1, further comprising a user interface for performing at least a portion of the one or more SAN management tasks on the virtual SAN objects in response to user interaction with the user interface.

8. A system, comprising:
a memory;
a storage area network (SAN) management server configured to discover and manage SANs; and
a means for generating in the memory a virtual SAN comprising a plurality of virtual SAN objects, wherein each of the plurality of virtual SAN objects is configured to simulate presence of a SAN device without underlying hardware to implement functionality for the SAN device actually existing in the SAN;
wherein the SAN management server is configured to access the virtual SAN in the memory to perform one or more SAN management tasks on one or more of the virtual SAN objects.

9. The system as recited in claim 8, wherein the means for generating is configured to:
access a configuration file from a data store, wherein the configuration file comprises information for generating one or more virtual SAN objects of one or more SAN object types; and
generate in the memory the plurality of virtual SAN objects of the virtual SAN in accordance with the information for generating one or more virtual SAN objects of one or more SAN object types.

10. The system as recited in claim 9, wherein the means for generating is further configured to:
for each SAN object type:
    determine if the SAN object type is compatible with the SAN management system;
    if the SAN object type is compatible with the SAN management system, include the generated one or more virtual SAN objects of the SAN object type in the virtual SAN; and
    if the SAN object type is not compatible with the SAN management system, not include the generated one or more virtual SAN objects of the SAN object type in the virtual SAN.

11. The system as recited in claim 8, further comprising an explorer configured to access the virtual SAN in the memory, wherein, to access the virtual SAN in the memory to perform one or more SAN management tasks on one or more of the virtual SAN objects, the SAN management server is further configured to access the virtual SAN through the explorer, wherein the explorer is an executable component.

12. The system as recited in claim 8, further comprising a zone management application programming interface (API), wherein the SAN management server is further configured to access the zone management API to perform zone management tasks on the virtual SAN.

13. The system as recited in claim 8, further comprising a logical unit number (LUN) management application programming interface (API), wherein the SAN management server is further configured to access the LUN management API to perform port binding and LUN security tasks on the virtual SAN.

14. The system as recited in claim 8, further comprising a user interface for performing at least a portion of the one or more SAN management tasks on the virtual SAN objects in response to user interaction with the user interface.

15. A method comprising:
one or more computers performing:
    generating a plurality of virtual storage area network (SAN) objects;
    generating a data representation of a SAN comprising the plurality of virtual SAN objects;
    accessing the data representation of the SAN to perform one or more SAN management tasks on one or more of virtual SAN objects;
    wherein each of the plurality of virtual SAN objects is configured to simulate presence of San device without underlying hardware to implement functionality for the SAN device actually existing in the SAN.

16. The method as recited in claim 15, wherein said generating a plurality of virtual storage area network (SAN) objects comprises:
  accessing a configuration file comprising information for generating the plurality of virtual SAN objects;
  generating the plurality of virtual SAN objects in accordance with the information for generating the plurality of virtual SAN objects.

17. The method as recited in claim 15, wherein the plurality of virtual SAN objects comprises one or more virtual SAN objects of one or more SAN object types, and wherein said generating a plurality of virtual storage area network (SAN) objects comprises:
  for each SAN object type:
    determining if the SAN object type is compatible with the SAN management system;
    if the SAN object type is compatible with the SAN management system, including the generated one or more virtual SAN objects of the SAN object type in the data representation of the SAN; and
    if the SAN object type is not compatible with the SAN management system, not including the generated one or more virtual SAN objects of the SAN object type in the data representation of the SAN.

18. The method as recited in claim 15, wherein said accessing the data representation of the SAN to perform one or more SAN management tasks on one or more of the virtual SAN objects is performed by a SAN management server.

19. The method as recited in claim 15, wherein said accessing the data representation of the SAN to perform one or more SAN management tasks on one or more of the virtual SAN objects comprises:
  a SAN management server accessing an explorer; and
  the explorer accessing the data representation of the SAN, wherein the explorer is an executable component.

20. The method as recited in claim 15, wherein said accessing the data representation of the SAN to perform one or more SAN management tasks on one or more of the virtual SAN objects comprises accessing a zone management application programming interface (API) to perform zone management tasks on the data representation of the SAN.

21. The method as recited in claim 15, wherein said accessing the data representation of the SAN to perform one or more SAN management tasks on one or more of the virtual SAN objects comprises accessing a logical unit number (LUN) management application programming interface (API) to perform port binding and LUN security tasks on the data representation of the SAN.

22. The method as recited in claim 15, wherein said accessing the data representation of the SAN to perform one or more SAN management tasks on one or more of the virtual SAN objects comprises performing at least a portion of the one or more SAN management tasks on the virtual SAN objects in response to user interaction with a user interface.

23. A, computer-accessible storage medium program instructions, wherein the program instructions are configured to implement:
  generating a plurality of virtual storage area network (SAN) objects;
  generating a data representation of a SAN comprising the plurality of virtual SAN objects;
  accessing the data representation of the SAN to perform one or more SAN management tasks on one or more of virtual SAN objects;
  wherein each of the plurality of virtual SAN objects is configured to simulate presence of San device without underlying hardware to implement functionality for the SAN device actually existing in the SAN.

24. A, computer-accessible storage medium as recited in claim 23, wherein, in said generating a plurality of virtual storage area network (SAN) objects, the program instructions are further configured to implement:
  accessing a configuration file comprising information for generating the plurality of virtual SAN objects;
  generating the plurality of virtual SAN objects in accordance with the information for generating the plurality of virtual SAN objects.

25. A, computer-accessible storage medium as recited in claim 23, wherein the plurality of virtual SAN objects comprises one or more virtual SAN objects of one or more SAN object types, and wherein, in said generating a plurality of virtual SAN objects, the program instructions are further configured to implement:
  for each SAN object type:
    determining if the SAN object type is compatible with the SAN management system;
    if the SAN object type is compatible with the SAN management system, including the generated one or more virtual SAN objects of the SAN object type in the data representation of the SAN; and
    if the SAN object type is not compatible with the SAN management system, not including the generated one or more virtual SAN objects of the SAN object type in the data representation of the SAN.

26. A, computer-accessible storage medium as recited in claim 23, wherein said accessing the data representation of the SAN to perform one or more SAN management tasks on one or more of the virtual SAN objects is performed by a SAN management server.

27. A, computer-accessible storage medium as recited in claim 23, wherein said accessing the data representation of the SAN to perform one or more SAN management tasks on one or more of the virtual SAN objects, the program instructions are further configured to implement:
  a SAN management server accessing an explorer; and
  the explorer accessing the data representation of the SAN, wherein the explorer is an executable component.

28. A, computer-accessible storage medium as recited in claim 23, wherein said accessing the data representation of the SAN to perform one or more SAN management tasks on one or more of the virtual SAN objects, the program instructions are further configured to implement accessing a zone management application programming interface (API) to perform zone management tasks on the data representation of the SAN.

29. A, computer-accessible storage medium as recited in claim 23, wherein said accessing the data representation of the SAN to perform one or more SAN management tasks on one or more of the virtual SAN objects, the program instructions are further configured to implement accessing a logical unit number (LUN) management application programming interface (API) to perform port binding and LUN security tasks o the data representation of the SAN.

30. A, computer-accessible storage medium as recited in claim 23, wherein said accessing the data representation of the SAN to perform one or more SAN management tasks on one or more of the virtual SAN objects, the program instructions are further configured to implement performing at least a portion of the one or more SAN management tasks on the virtual SA objects in response to user interaction with a user interface.

* * * * *